United States Patent
Tsuruta

(10) Patent No.: US 10,879,573 B2
(45) Date of Patent: Dec. 29, 2020

(54) ENERGY STORAGE APPARATUS AND METHOD OF MANUFACTURING ENERGY STORAGE APPARATUS

(71) Applicant: GS Yuasa International Ltd., Kyoto (JP)

(72) Inventor: Shogo Tsuruta, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 1267 days.

(21) Appl. No.: 14/843,677

(22) Filed: Sep. 2, 2015

(65) Prior Publication Data

US 2016/0072163 A1    Mar. 10, 2016

(30) Foreign Application Priority Data

Sep. 4, 2014  (JP) ................. 2014-180646
Jun. 24, 2015  (JP) ................. 2015-127060

(51) Int. Cl.
| | |
|---|---|
| *H01M 10/65* | (2014.01) |
| *H01M 10/61* | (2014.01) |
| *H01M 2/10* | (2006.01) |
| *H01M 10/05* | (2010.01) |
| *H01M 10/42* | (2006.01) |
| *H01M 10/658* | (2014.01) |
| *H01M 10/613* | (2014.01) |
| *H01M 10/0525* | (2010.01) |
| *H01M 10/647* | (2014.01) |

(52) U.S. Cl.
CPC ....... *H01M 10/658* (2015.04); *H01M 2/1016* (2013.01); *H01M 2/1022* (2013.01); *H01M 2/1072* (2013.01); *H01M 2/1077* (2013.01); *H01M 10/0525* (2013.01); *H01M 10/425* (2013.01); *H01M 10/613* (2015.04); *H01M 2/1061* (2013.01); *H01M 10/647* (2015.04)

(58) Field of Classification Search
None
See application file for complete search history.

(56) References Cited

U.S. PATENT DOCUMENTS 5,272,018 A * 12/1993 Schlichenmaier .... H01M 2/043 429/57
8,330,416 B2 * 12/2012 Goma ................... H01M 10/46 320/107

(Continued)

FOREIGN PATENT DOCUMENTS

| CN | 1652372 A | 8/2005 |
|---|---|---|
| JP | 2001-256938 A | 9/2001 |

(Continued)

*Primary Examiner* — Maria Laios
*Assistant Examiner* — Angela J Martin
(74) *Attorney, Agent, or Firm* — McGinn I.P. Law Group, PLLC.

(57) ABSTRACT

An energy storage apparatus includes: one or more energy storage devices; and a first outer covering and a second outer covering arranged outside said one or more energy storage devices. The energy storage apparatus further includes: a weld portion which is a joint portion between the first outer covering and the second outer covering formed by joining the first outer covering and the second outer covering to each other by welding; a heat-susceptible object; and a heat shielding portion arranged between the weld portion and the heat-susceptible object.

17 Claims, 13 Drawing Sheets

(56) References Cited

U.S. PATENT DOCUMENTS

| | | |
|---|---|---|
| 2003/0146734 A1 | 8/2003 | Kozu et al. |
| 2012/0141861 A1 | 6/2012 | Uchida |
| 2013/0029192 A1 | 1/2013 | Oya |
| 2013/0183573 A1 | 7/2013 | Yoshioka et al. |

FOREIGN PATENT DOCUMENTS

| | | | | | |
|---|---|---|---|---|---|
| JP | 2001256938 A | * | 9/2001 | ............. | H01M 2/02 |
| JP | 2002-237280 | * | 8/2002 | ............. | H01M 2/10 |
| JP | 2002-237280 A | | 8/2002 | | |
| JP | 2002-245993 | * | 8/2002 | ............. | H01M 2/10 |
| JP | 2002-245993 A | | 8/2002 | | |
| JP | 2007-157472 A | | 6/2007 | | |
| JP | 2009-181830 | * | 8/2009 | ............. | H01M 2/10 |
| JP | 2009-181830 A | | 8/2009 | | |
| JP | 2011-081981 | * | 4/2011 | ............ | H01M 10/50 |
| JP | 2011-081981 A | | 4/2011 | | |
| JP | 2011-134552 A | | 7/2011 | | |
| JP | 2012-69337 | * | 4/2012 | ............ | H01M 10/42 |
| JP | 2012-069337 A | | 4/2012 | | |
| JP | 2013-168356 A | | 8/2013 | | |
| JP | 2013-196850 | * | 9/2013 | ............ | H01M 10/50 |
| JP | 2013-196850 A | | 9/2013 | | |
| JP | 2013-246877 A | | 12/2013 | | |
| JP | 2014-089839 A | | 5/2014 | | |

\* cited by examiner

ENERGY STORAGE APPARATUS AND METHOD OF MANUFACTURING ENERGY STORAGE APPARATUS

CROSS-REFERENCE TO RELATED APPLICATIONS

This application claims the benefit of Japanese patent applications No. 2014-180646, filed on Sep. 4, 2014, and No. 2015-127060, filed on Jun. 24, 2015, which are incorporated by reference.

FIELD

The present invention relates to an energy storage apparatus which includes one or more energy storage devices and an outer covering arranged outside such one or more energy storage devices and a method of manufacturing an energy storage apparatus.

BACKGROUND

Conventionally, there has been known an energy storage apparatus where one or more energy storage devices are accommodated in an outer covering (see JP-A-2011-134552, for example).

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

As a configuration for accommodating the energy storage devices in the outer covering, it may be possible to adopt the configuration where energy storage devices are inserted into an outer covering body having an opening, and the energy storage devices are accommodated in the outer covering by closing the opening of the outer covering body by a lid member. In closing the opening of the outer covering body by the lid member, the outer covering body and the lid member may be joined to each other by welding.

However, when the outer covering body and the lid member are joined to each other by welding, heat generated by welding exerts on an object weak to heat (weak-to-heat object or heat-susceptible object) such as a printed circuit board arranged in the inside of the energy storage apparatus thus giving rise to a possibility that a function of the heat-susceptible object is lowered.

An object of the present invention to provide an energy storage apparatus which can reduce an effect of heat generated by welding even when the outer covering is joined by welding.

An energy storage apparatus according to an aspect of the present invention includes: one or more energy storage devices; a first outer covering and a second outer covering arranged outside the above-mentioned one or more energy storage devices; a weld portion which is a joint portion between the first outer covering and the second outer covering formed by joining the first outer covering and the second outer covering to each other by welding; a heat-susceptible object; and a heat shielding portion arranged between the weld portion and the heat-susceptible object.

BRIEF DESCRIPTION OF DRAWINGS

The foregoing and other features of the present invention will become apparent from the following description and drawings of an illustrative embodiment of the invention in which.

DESCRIPTION OF EMBODIMENTS

Figure 1:
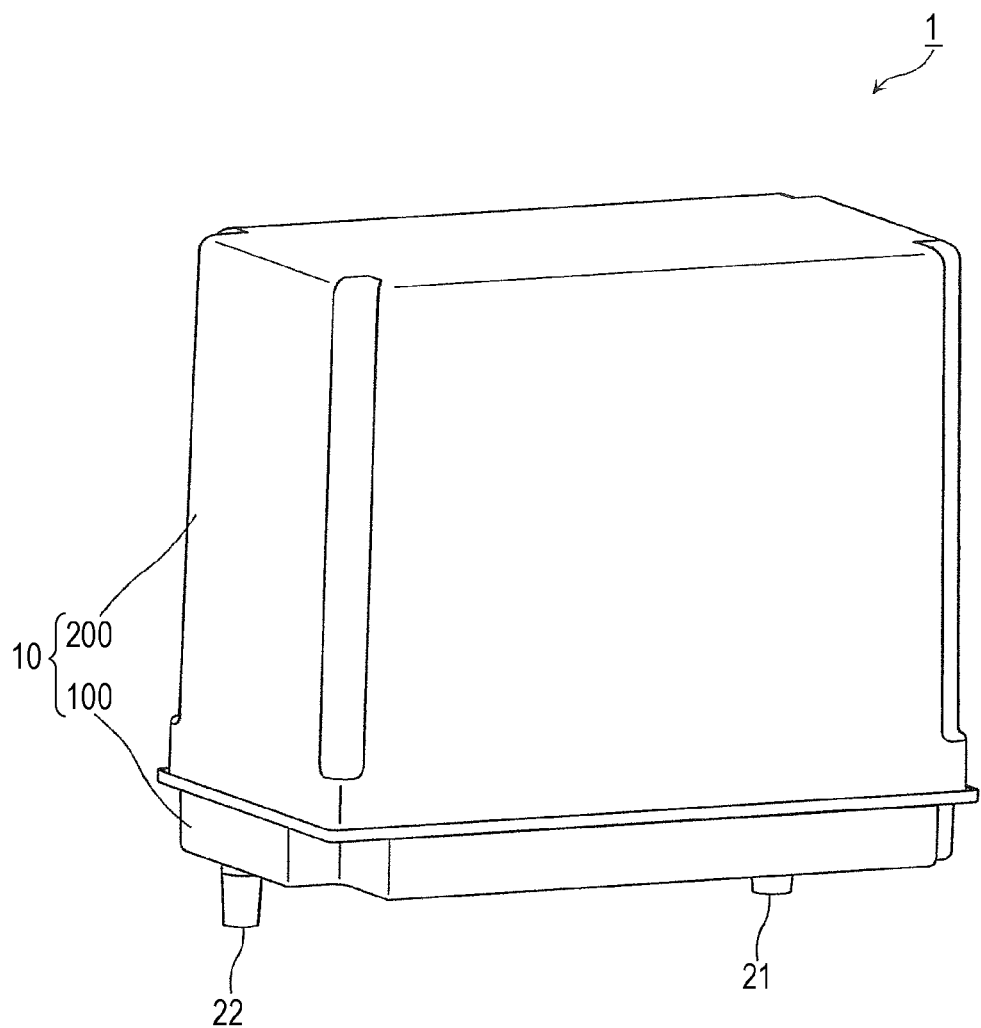
FIG. 1 is a perspective view showing an external appearance of an energy storage apparatus according to an embodiment of the present invention.

An energy storage apparatus according to an aspect of the present invention includes: one or more energy storage devices; a first outer covering and a second outer covering arranged outside the above-mentioned one or more energy storage devices; a weld portion which is a joint portion between the first outer covering and the second outer covering formed by joining the first outer covering and the second outer covering to each other by welding; a heat-susceptible object; and a heat shielding portion arranged between the weld portion and the heat-susceptible object.

In such a configuration, the energy storage apparatus includes the heat shielding portion between the weld portion which is the joint portion formed by welding the first outer covering and the second outer covering to each other and the heat-susceptible object which causes lowering of functions thereof with heat. Accordingly, even when the outer covering is joined by welding, heat generated by welding can be shielded by the heat shielding portion and hence, it is possible to reduce an effect which heat generated by welding exerts on a heat-susceptible object.

The first outer covering may include a first projecting portion which projects toward the second outer covering as the heat shielding portion.

With such a configuration, in the energy storage apparatus, the heat shielding portion can be easily formed by providing the first projecting portion which projects toward the second outer covering to the first outer covering as the heat shielding portion.

The first outer covering or the second outer covering may include the second projecting portion arranged so as to sandwich the weld portion between the first projecting portion and the second projecting portion.

With such a configuration, the first outer covering or the second outer covering includes the second projecting portion and hence, the alignment between the first outer covering and the second outer covering can be easily performed using the first projecting portion and the second projecting portion. Further, the weld portion can be concealed by the second projecting portion such that the weld portion is not exposed to the outside of the energy storage apparatus and hence, the external appearance of the energy storage apparatus can be enhanced.

The second projecting portion may be formed on the first outer covering, and the first projecting portion may have a larger height than the second projecting portion.

With such a configuration, out of the first projecting portion and the second projecting portion which sandwich the weld portion therebetween, the first projecting portion has a larger height. That is, it is sufficient that the first projecting portion carries out a function of a heat shielding portion, and it is unnecessary to form the second projecting portion with a large height. Accordingly, the first projecting portion has a larger height than the second projecting portion. With such a configuration, it is possible to reduce an effect which heat generated by welding exerts on a heat-susceptible object.

The first projecting portion may be an annular projecting portion formed on an edge portion of the first outer covering on a second outer covering side.

With such a configuration, the first projecting portion is annularly formed on the edge portion of the first outer covering and hence, the transfer of heat to the inside of the first projecting portion which is formed into an annular shape can be suppressed whereby it is possible to reduce an effect which heat generated by welding exerts on a heat-susceptible object.

The heat shielding portion may be arranged away from the heat-susceptible object.

With such a configuration, the heat shielding portion is arranged away from the heat-susceptible object and hence, the transfer of heat generated by welding to the heat-susceptible object through the heat shielding portion can be suppressed whereby it is possible to reduce an effect which heat generated by welding exerts on a heat-susceptible object.

The heat shielding portion may include a heat insulating portion formed using a heat insulating material.

With such a configuration, the heat shielding portion includes the heat insulating portion formed using a heat insulating material and hence, the transfer of heat generated by welding to the heat-susceptible object can be further suppressed by the heat insulating portion whereby it is possible to reduce an effect which heat exerts on a heat-susceptible object.

The heat insulating portion may be a cover which covers the heat-susceptible object.

With such a configuration, the cover which covers the heat-susceptible object is formed using a heat insulating material and hence, the transfer of heat generated by welding to the heat-susceptible object can be further suppressed by the cover whereby it is possible to reduce an effect which heat exerts on a heat-susceptible object.

The heat-susceptible object may include a printed circuit board electrically connected to the energy storage device.

With such a configuration, the heat-susceptible object includes the printed circuit board and hence, it is possible to reduce an effect which heat generated by welding exerts on the printed circuit board.

The printed circuit board may be arranged between the energy storage device and the weld portion at a position closer to the weld portion than the energy storage device.

With such a configuration, the printed circuit board is arranged at the position closer to the weld portion than the energy storage device (in the vicinity of the weld portion). However, the heat shielding portion is arranged between the printed circuit board and the weld portion and hence, it is possible to reduce an effect which heat generated by welding exerts on the printed circuit board.

The heat-susceptible object may include a non-aqueous electrolytic secondary battery which is the energy storage device.

With such a configuration, the heat-susceptible object is the non-aqueous electrolytic secondary battery and hence, it is possible to reduce an effect which heat generated by welding exerts on the non-aqueous electrolytic secondary battery which is weak to heat.

The heat-susceptible object may include the energy storage device having a lid portion arranged close to the weld portion.

With such a configuration, the heat-susceptible object includes the energy storage device having the lid portion arranged close to the weld portion. That is, a resin-made packing is usually arranged on the lid portion of a container of the energy storage device, and the packing is weak to heat. With the provision of the lid portion, it is possible to reduce an effect which heat generated by welding exerts on the packing.

The heat-susceptible object may include a resin-made frame body.

With such a configuration, the heat-susceptible object is the resin-made frame body and hence, it is possible to reduce an effect which heat generated by welding exerts on the frame body which is weak to heat.

Another aspect of the present invention provides an energy storage apparatus including: one or more energy storage devices; a first outer covering and a second outer covering arranged outside the above-mentioned one or more energy storage devices; a weld portion which is a joint portion between the first outer covering and the second outer covering formed by joining the first outer covering and the second outer covering to each other by welding; a first projecting portion formed on the first outer covering and projecting toward the second outer covering; and a second projecting portion formed on the first outer covering or the second outer covering, and arranged so as to sandwich the weld portion between the first projecting portion and the second projecting portion.

Accordingly, the energy storage apparatus includes the first projecting portion and the second projecting portion such that the first projecting portion and the second projecting portion sandwiches therebetween the weld portion which is the joint portion formed by welding the first outer covering and the second outer covering to each other. With such a configuration, heat generated by welding can be shielded by the projecting portion disposed inside out of the first projecting portion and the second projecting portion and hence, it is possible to reduce an effect which heat exerts on equipment arranged inside the energy storage apparatus. Further, the weld portion can be concealed such that the weld portion is not exposed to the outside the energy storage apparatus by the projecting portion disposed outside out of the first projecting portion and the second projecting portion and hence, the external appearance of the energy storage apparatus can be enhanced. Further, the alignment between the first outer covering and the second outer covering can be easily performed using the first projecting portion and the second projecting portion.

The first outer covering may be configured such that, with the weld portion interposed between the first projecting portion and the second projecting portion, the first projecting portion is disposed inside the weld portion and the second projecting portion is disposed outside the weld portion, and the first projecting portion may have the larger height than the second projecting portion.

In such a configuration, out of the first projecting portion and the second projecting portion which sandwich the weld portion therebetween, the first projecting portion disposed inside has a larger height than the second projecting portion. That is, it is sufficient that the first projecting portion carries out a function of shielding heat generated by welding, and it is unnecessary to form the second projecting portion having a large height. Accordingly, the first projecting portion has a larger height than the second projecting portion. Accordingly, it is possible to reduce an effect which heat generated by welding exerts on equipment disposed inside the energy storage apparatus.

Still another aspect of the present invention provides a method of manufacturing an energy storage apparatus which includes: one or more energy storage devices; a first outer covering and a second outer covering arranged outside the above-mentioned one or more energy storage devices; a heat-susceptible object; and a heat shielding portion, the method comprising: heating a joint portion between the first outer covering and the second outer covering, the joint portion being arranged so as to sandwich the heat shielding portion between the joint portion and the heat-susceptible object; and joining by welding the first outer covering and the second outer covering at the joint portion.

In such a configuration, in the method of manufacturing an energy storage apparatus, the joint portion between the first outer covering and the second outer covering arranged so as to sandwich the heat shielding portion between the joint portion and the heat-susceptible object is heated, and the first outer covering and the second outer covering are joined to each other by welding at the joint portion. Accordingly, even when joining of the outer coverings is performed by welding, it is possible to suppress the transfer of heat generated by welding to the heat-susceptible object by the heat shielding portion and hence, it is possible to reduce an effect which heat exerts on a heat-susceptible object.

According to the aspects of the present invention, even when joining of the outer coverings is performed by welding, it is possible to reduce an effect which heat generated by welding exerts on.

Hereinafter, energy storage apparatuses according to embodiments of the present invention are described with reference to drawings. All embodiments described hereinafter describe preferred specific examples of the present invention. In the embodiments described hereinafter, numerical values, shapes, materials, elements, arrangement positions and connection states of the elements, manufacturing steps, the order of the manufacturing steps and the like are merely examples, and these are not intended to be used for limiting the present invention. Further, out of the elements in the embodiments described hereinafter, the elements which are not described in independent claims describing an uppermost concept are described as arbitrary elements. In the respective drawings, the respective elements are not always described strictly accurately in size or the like.

Embodiments

Firstly, the configuration of an energy storage apparatus 1 is described.

Figure 2:
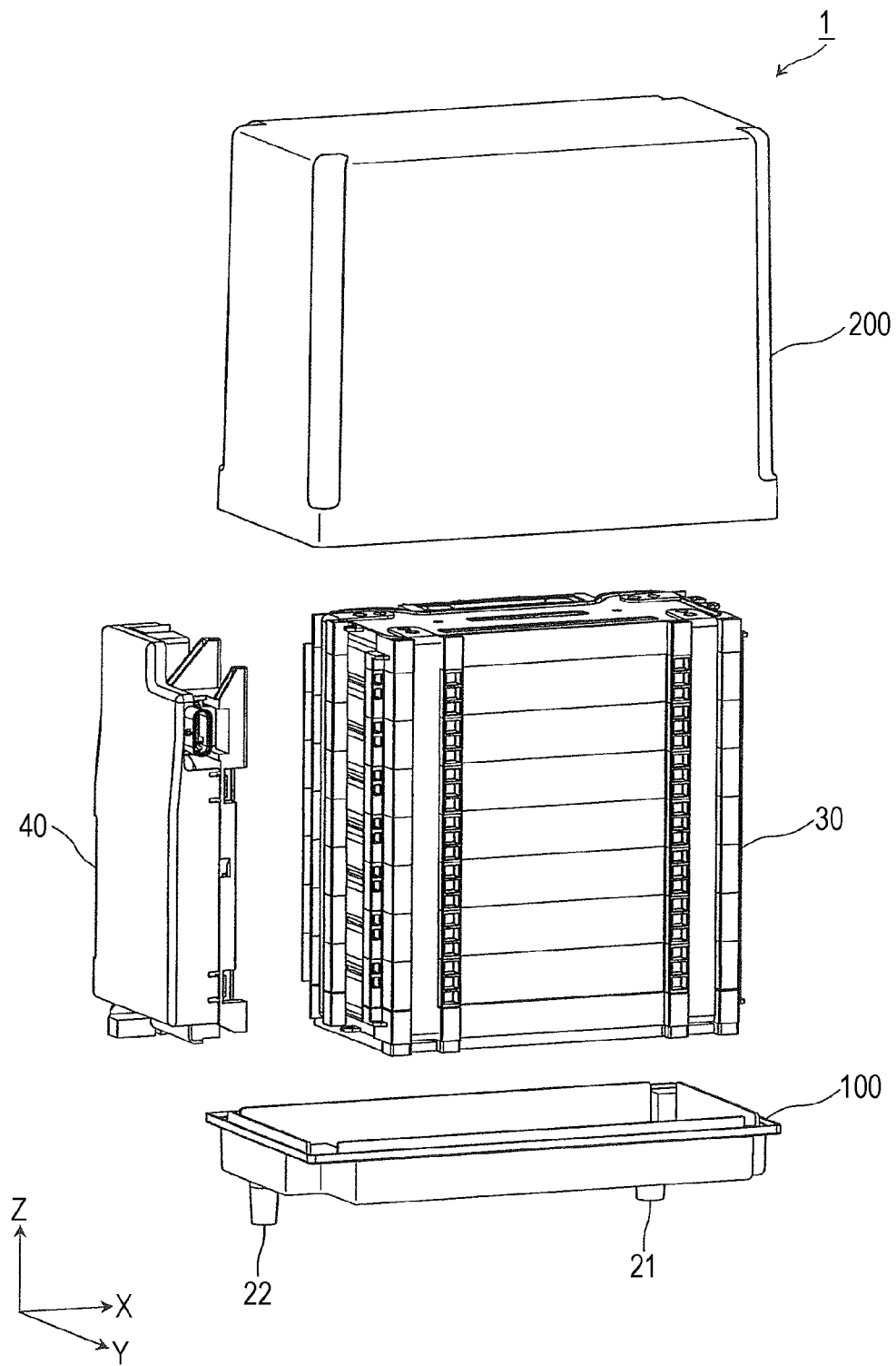
FIG. 2 is an exploded perspective view showing respective elements of the energy storage apparatus in an exploded manner.

FIG. 1 is a perspective view showing an external appearance of the energy storage apparatus 1 according to an embodiment of the present invention. FIG. 2 is an exploded perspective view showing respective elements of the energy storage apparatus 1 in an exploded manner.

In these drawings, the Z axis direction is indicated as the vertical direction, and the description is made hereinafter using the Z axis direction as the vertical direction. However, there may be also a case where the Z axis direction is not the vertical direction depending on a mode of use and hence, the Z axis direction is not limited to the vertical direction. Further, when the Z axis direction is the vertical direction, in a normal mode of use, the minus side in the Z axis direction becomes the upper side in the vertical direction in many cases. However, for the sake of convenience of the description, the Z axis direction is indicated such that the plus side in the Z axis direction is the upper side in the vertical direction. The same goes for drawings referenced hereinafter (FIG. 3, FIG. 7 to FIG. 13).

The energy storage apparatus 1 is a device which charges electricity from the outside therein or can discharge electricity to the outside. For example, the energy storage apparatus 1 is a battery module used for power storage application or power source application.

As shown in these drawings, the energy storage apparatus 1 includes: an outer covering 10 formed of a first outer covering 100 and a second outer covering 200; and an energy storage unit 30 and electric equipment 40 which are accommodated in the inside of the outer covering 10.

The outer covering 10 is a container (module case) having a rectangular shape (box shape) which is arranged outside the energy storage unit 30 and the electric equipment 40, and constitutes an outer covering of the energy storage apparatus 1. That is, in the outer covering 10, the energy storage unit 30 and the electric equipment 40 are arranged at predetermined positions, and the outer covering 10 protects the energy storage unit 30 and the electric equipment 40 from an impact or the like. The outer covering 10 is formed using an insulating resin or the like, and prevents the energy storage unit 30 and the electric equipment 40 from coming into contact with a metal member or the like disposed outside the outer covering 10.

The outer covering 10 includes: the first outer covering 100 forming a lid member of the outer covering 10; and the second outer covering 200 forming a body of the outer covering 10. The first outer covering 100 is a cover member having a flat rectangular shape which closes an opening of the second outer covering 200. A positive external terminal 21 and a negative external terminal 22 are formed on the first outer covering 100. The energy storage apparatus 1 charges electricity from the outside therein or discharges electricity to the outside through the positive external terminal 21 and the negative external terminal 22. The second outer covering 200 is a bottomed rectangular cylindrical housing having the opening, and the energy storage unit 30 and the electric equipment 40 are accommodated in the second outer covering 200. The detailed configuration of the first outer covering 100 and the second outer covering 200 are described later.

The energy storage unit 30 includes one or more energy storage devices, and the energy storage devices are connected to the positive external terminal 21 and the negative external terminal 22 formed on the first outer covering 100. In this embodiment, as shown in FIG. 2, the energy storage unit 30 is arranged on the first outer covering 100 in a state where a plurality of energy storage devices in a horizontally laid state are stacked in the Z axis direction. The energy storage unit 30 is covered by the second outer covering 200 from above so that the energy storage unit 30 is arranged in the second outer covering 200. The detailed configuration of the energy storage unit 30 is described later.

The electric equipment 40 is equipment having a rectangular shape in which a printed circuit board and the like are arranged, and the electric equipment 40 is arranged on the side (the minus side in the X axis direction) of the energy storage unit 30. In this embodiment, as shown in FIG. 2, the electric equipment 40 is arranged on the first outer covering 100 upright in the Z axis direction in a state where the printed circuit board is laid vertically. The electric equipment 40 is covered by the second outer covering 200 from above so that the electric equipment 40 is arranged in the second outer covering 200. The detailed configuration of the electric equipment 40 is described later.

Next, the configuration of the first outer covering 100 and the second outer covering 200 which the outer covering 10 includes is described in detail. Firstly, the configuration of the first outer covering 100 is described in detail.

Figure 3:
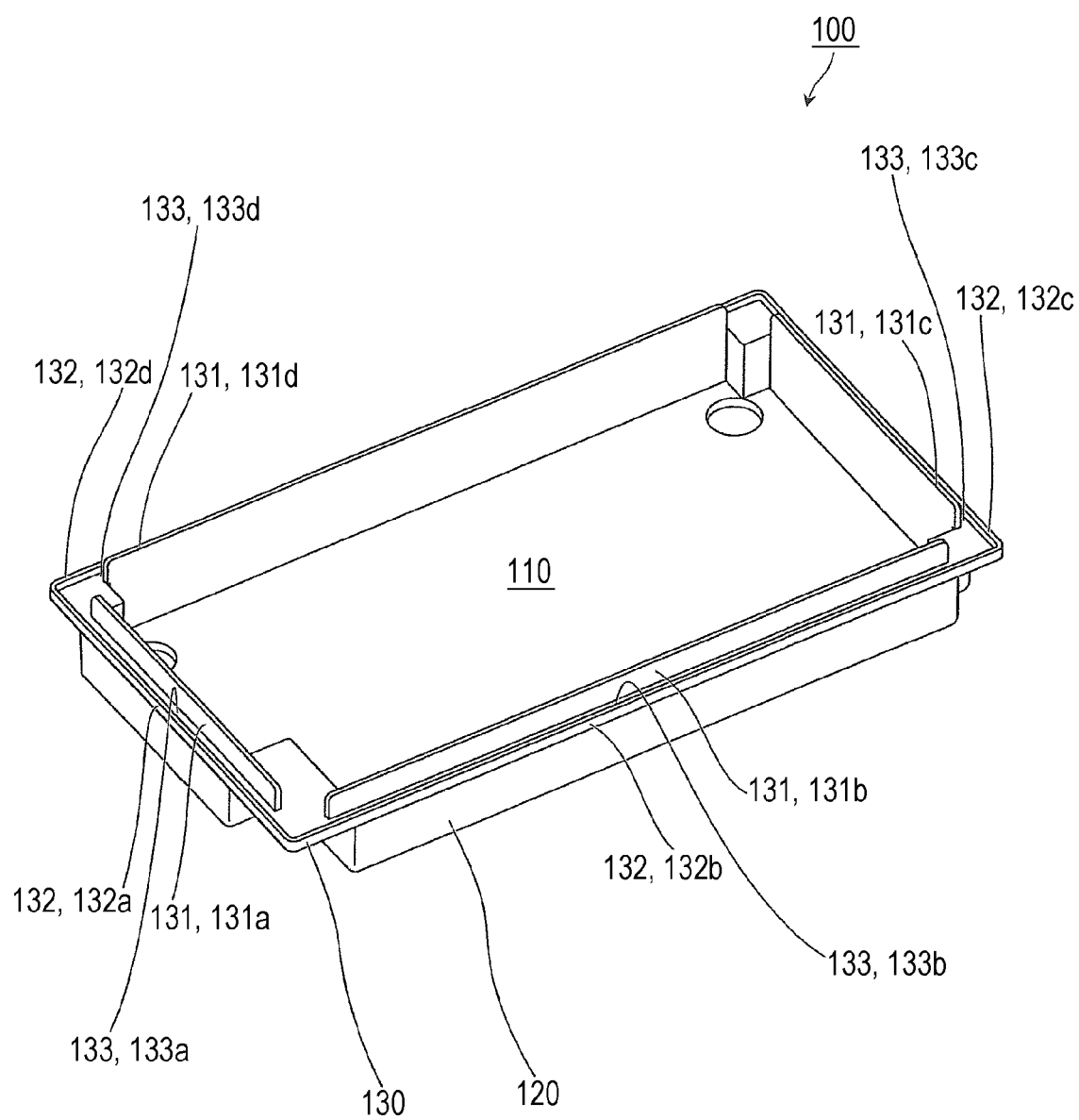
FIG. 3 is a perspective view showing a configuration of a first outer covering.

FIG. 3 is a perspective view showing the configuration of the first outer covering 100.

The first outer covering 100 is a flat rectangular member arranged outside the energy storage unit 30 including one or more energy storage devices, and is formed using an insulation resin such as polycarbonate or polypropylene (PP), for example. As shown in FIG. 3, the first outer covering 100 includes: a first flat surface portion 110; a first side surface portion 120; and a first connecting portion 130.

The first flat surface portion 110 is a bottom surface portion of the first outer covering 100 (an upper surface portion of the first outer covering 100 when the minus side in the Z axis direction is the upper side in the vertical direction), and is also a rectangular plate-like portion.

The first side surface portion 120 is a portion having a rectangular cylindrical shape which covers four sides of the first flat surface portion 110 and is formed of four side surface portions having a rectangular plate-like shape. The first side surface portion 120 is formed such that the first side surface portion 120 is raised from an outer peripheral edge of the first flat surface portion 110 toward the plus side in the Z axis direction (extending downward toward the minus side in the Z axis direction).

The first connecting portion 130 is a portion which is arranged on the plus side of the first side surface portion 120 in the Z axis direction, and is connected to the second outer covering 200. To be more specific, the first connecting portion 130 is an annular portion formed on the first side surface portion 120, and is joined to the second outer covering 200 by welding (by thermal welding in this embodiment). The first outer covering 100 and the second outer covering 200 are joined to each other by thermal welding in the case where the first outer covering 100 and the second outer covering 200 are formed using PP or the like, for example. That is, PP has electrolytic solution resistance and is inexpensive so that PP is preferably used as a material for forming the first outer covering 100 and the second outer covering 200. However, PP is a material which minimally adheres and has a relatively low strength and hence, it is necessary to join the first outer covering 100 and the second outer covering 200 to each other by thermal welding so as to maintain airtightness.

In this embodiment, the first connecting portion 130 includes: a first projecting portion 131; a second projecting portion 132; and a first joint portion 133.

The first joint portion 133 is an annular portion which is joined to the second outer covering 200 when the first outer covering 100 and the second outer covering 200 are joined to each other by thermal welding so as to form a weld portion 11 described later. That is, in a portion where the first outer covering 100 and the second outer covering 200 are joined to each other by thermal welding, the first joint portion 133 is a portion on a first outer covering 100 side before the first outer covering 100 and the second outer covering 200 are joined to each other by thermal welding.

To be more specific, the first joint portion 133 is an annular portion formed of a first joint portion 133a; a first joint portion 133b; a first joint portion 133c; and a first joint portion 133d. The first joint portion 133a is an elongated plate-like portion which is arranged on the minus side of the first joint portion 133 in the X axis direction, and extends in the Y axis direction. The first joint portion 133b is an elongated plate-like portion which is arranged on the plus side of the first joint portion 133 in the Y axis direction, and extends in the X axis direction. The first joint portion 133c is an elongated plate-like portion which is arranged on the plus side of the first joint portion 133 in the X axis direction, and extends in the Y axis direction. The first joint portion 133d is an elongated plate-like portion which is arranged on the minus side of the first joint portion 133 in the Y axis direction, and extends in the X axis direction.

The first projecting portion 131 is a projecting portion which projects toward the second outer covering 200. To be more specific, the first projecting portion 131 is an annular projecting portion (rib) formed on an edge portion of the first outer covering 100 on the second outer covering 200 side. To be more specific, the first projecting portion 131 is a projecting portion (rib) which is raised from a surface having the first joint portion 133. That is, the first projecting portion 131 is an annular portion which is arranged so as to sandwich the first joint portion 133 (or a weld portion 11 described later) between the first projecting portion 131 and the second projecting portion 132, and projects in a raised manner toward the plus side in the Z axis direction from inside the first joint portion 133.

To be more specific, the first projecting portion 131 is an annular portion which is formed of a first projecting portion 131a, a first projecting portion 131b, a first projecting portion 131c and a first projecting portion 131d which are arranged corresponding to the first joint portion 133a, the first joint portion 133b, the first joint portion 133c and the first joint portion 133d, respectively.

The first projecting portion 131a is an elongated plate-like portion which projects toward the plus side in the Z axis direction from the plus side of the first joint portion 133a in the X axis direction, and extends in the Y axis direction. The first projecting portion 131b is an elongated plate-like portion which projects toward the plus side in the Z axis direction from the minus side of the first joint portion 133b in the Y axis direction, and extends in the X axis direction. The first projecting portion 131c is an elongated plate-like portion which projects toward the plus side in the Z axis direction from the minus side of the first joint portion 133c in the X axis direction, and extends in the Y axis direction. The first projecting portion 131d is an elongated plate-like portion which projects toward the plus side in the Z axis direction from the plus side of the first joint portion 133d in the Y axis direction, and extends in the X axis direction.

In this embodiment, the first projecting portion 131 functions as a heat shielding portion for shielding heat generated when the first outer covering 100 and the second outer covering 200 are joined to each other by thermal welding so as to form the weld portion 11 described later. That is, the first projecting portion 131 is a heat shielding portion which is arranged between the weld portion 11 and a heat-susceptible object, and shields the heat transfer to the heat-susceptible object.

The heat-susceptible object means an object which causes lowering of functions thereof with heat. For example, the heat-susceptible object may be the electric equipment 40 (or the printed circuit board in the electric equipment 40 and the like) or the energy storage unit 30 (or the energy storage devices, the spacers and the like in the energy storage unit 30). In this embodiment, "causes lowering of functions thereof with heat" is a concept that an operation malfunctions (is erroneously operated) with heat, a concept that on object is deformed with heat, a concept that an object is damaged with heat, a concept that a strength of an object is lowered below a predetermined strength with heat and the like. That is, the heat-susceptible object is a concept which includes a member formed using a material having a melting point (or a glass transition temperature) lower than a predetermined temperature.

For example, in the case where the heat-susceptible object is the electric equipment 40 (or the printed circuit board or the like in the electric equipment 40), the first projecting portion 131a arranged between the weld portion 11 and the electric equipment 40 forms the heat shielding portion. On the other hand, in the case where the heat-susceptible object is the energy storage unit 30 (or the energy storage devices, the spacers or the like in the energy storage unit 30), the first projecting portions 131b to 131d arranged between the weld portion 11 and the energy storage unit 30 form the heat shielding portion.

The second projecting portion 132 is an annular portion which is arranged so as to sandwich the first joint portion 133 (or the weld portion 11 described later) between the second projecting portion 132 and the first projecting portion 131, and projects in a raised manner toward the plus side in the Z axis direction from outside the first joint portion 133. That is, in the same manner as the first projecting portion 131, the second projecting portion 132 is a projecting portion which projects toward the second outer covering 200. To be more specific, the second projecting portion 132 is an annular projecting portion (rib) which is formed on an edge portion of the first outer covering 100 on a second outer covering 200 side. In this manner, the first outer covering 100 is configured such that, with the first joint portion 133 (weld portion 11) interposed between the first projecting portion 131 and the second projecting portion 132, the first projecting portion 131 is disposed inside the first joint portion 133 (weld portion 11), and the second projecting portion 132 is disposed outside the first joint portion 133 (weld portion 11).

To be more specific, the second projecting portion 132 is an annular portion which is formed of a second projecting portion 132a, a second projecting portion 132b, a second projecting portion 132c and a second projecting portion 132d which are arranged corresponding to the first joint portion 133a, the first joint portion 133b, the first joint portion 133c and the first joint portion 133d, respectively.

The second projecting portion 132a is an elongated plate-like portion which projects toward the plus side in the Z axis direction from the minus side of the first joint portion 133a in the X axis direction, and extends in the Y axis direction. The second projecting portion 132b is an elongated plate-like portion which projects toward the plus side in the Z axis direction from the plus side of the first joint portion 133b in the Y axis direction, and extends in the X axis direction. The second projecting portion 132c is an elongated plate-like portion which projects toward the plus side in the Z axis direction from the plus side of the first joint portion 133c in the X axis direction, and extends in the Y axis direction. The second projecting portion 132d is an elongated plate-like portion which projects toward the plus side in the Z axis direction from the minus side of the first joint portion 133d in the Y axis direction, and extends in the X axis direction.

In this embodiment, the first projecting portion 131 has a larger height than the second projecting portion 132. That is, on the first connecting portion 130 of the first outer covering 100 which is connected to the second outer covering 200, the ribs are formed such that the inner rib has a larger height than the outer rib.

To be more specific, the first projecting portion 131a is formed so as to project with a larger height than the second projecting portion 132a in the Z axis direction. The first projecting portion 131b is formed so as to project with a larger height than the second projecting portion 132b in the Z axis direction. The first projecting portion 131c is formed so as to project with a larger height than the second projecting portion 132c in the Z axis direction. The first projecting portion 131d is formed so as to project with a larger height than the second projecting portion 132d in the Z axis direction.

The first projecting portion 131 is not limited to the case where the first projecting portion 131 has an annular shape. For example, the first projecting portion 131 may be formed of only the first projecting portion 131a, or may be formed of only a portion of the first projecting portion 131a. In the same manner, the second projecting portion 132 is also not limited to the case where the second projecting portion 132 has an annular shape. For example, the second projecting portion 132 may be formed of only the second projecting portion 132a, or may be formed of only a portion of the second projecting portion 132a.

The first projecting portion 131 is not limited to the configuration where all portions of the first projecting portion 131 have a larger height than the second projecting portion 132. The first projecting portion 131 may be configured such that a portion of the first projecting portion 131 has a smaller height than the second projecting portion 132. For example, the first projecting portion 131 may be configured such that only the first projecting portion 131a of the first projecting portion 131 has a larger height than the second projecting portion 132a. Alternatively, the first projecting portion 131 may be configured such that only a portion of the first projecting portion 131a has a larger height than the second projecting portion 132a.

Next, the configuration of the second outer covering 200 is described in detail.

Figure 4:
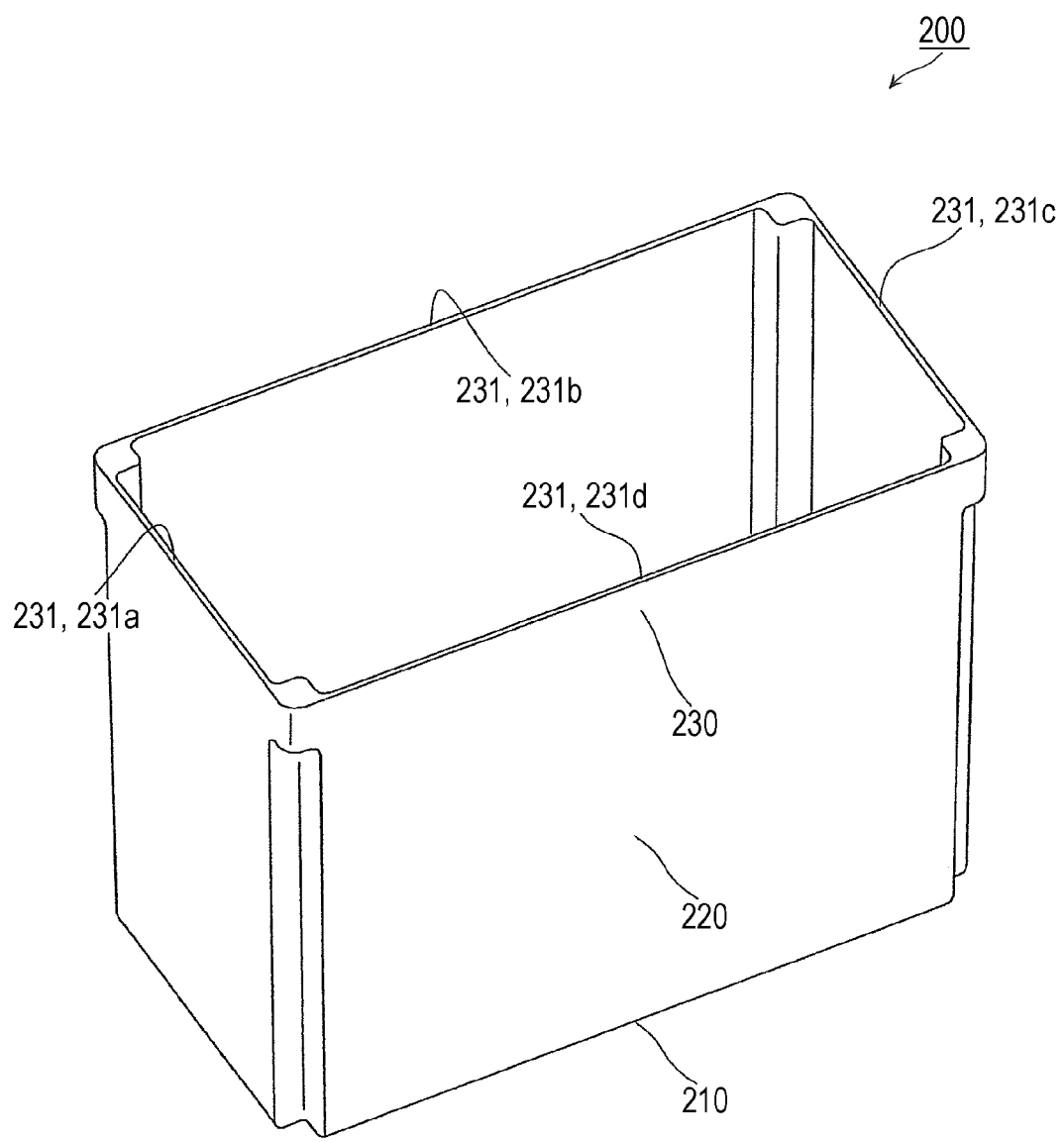
FIG. 4 is a perspective view showing a configuration of a second outer covering.

FIG. 4 is a perspective view showing the configuration of the second outer covering 200.

The second outer covering 200 is a bottomed rectangular cylindrical member arranged outside the energy storage unit 30 including one or more energy storage devices. In the same manner as the first outer covering 100, the second outer covering 200 is formed using an insulating resin such as polycarbonate or polypropylene (PP), for example. The first outer covering 100 and the second outer covering 200 are joined to each other by thermal welding so that it is preferable that the first outer covering 100 and the second outer covering 200 be made of the same kinds of materials which can be joined to each other by thermal welding, or the different kinds of materials having similar melting points.

As shown in FIG. 4, the second outer covering 200 includes: a second flat surface portion 210; a second side surface portion 220; and a second connecting portion 230.

The second flat surface portion 210 is an upper surface portion of the second outer covering 200 (a bottom surface portion of the second outer covering 200 when the minus side in the Z axis direction is the upper side in the vertical direction), and is also a rectangular plate-like portion.

The second side surface portion 220 is a portion having an approximately rectangular cylindrical shape which covers four sides of the second flat surface portion 210 and is formed of four side surface portions having a rectangular plate-like shape. The second side surface portion 220 is formed such that the second side surface portion 220 extends downward from an outer peripheral edge of the second flat surface portion 210 toward the plus side in the Z axis direction (being raised toward the minus side in the Z axis direction).

The second connecting portion 230 is a portion which is arranged on the minus side of the second side surface portion 220 in the Z axis direction, and is connected to the first outer covering 100. To be more specific, the second connecting portion 230 is an annular portion formed on an end portion of the second side surface portion 220 on the minus side in the Z axis direction, and is joined to the first connecting portion 130 of the first outer covering 100 by thermal welding. In this embodiment, the second connecting portion 230 includes a second joint portion 231 which is joined to the first joint portion 133 of the first connecting portion 130 by thermal welding.

The second joint portion 231 is an annular portion which is joined to the first joint portion 133 of the first outer covering 100 when the first outer covering 100 and the second outer covering 200 are joined to each other by thermal welding so as to form the weld portion 11 described later. That is, in a portion where the first outer covering 100 and the second outer covering 200 are joined to each other by thermal welding, the second joint portion 231 is a portion on the second outer covering 200 side before the first outer covering 100 and the second outer covering 200 are joined to each other by thermal welding.

To be more specific, the second joint portion 231 is an annular portion formed of: a second joint portion 231a; a second joint portion 231b; a second joint portion 231c; and a second joint portion 231d. The second joint portion 231a is an elongated plate-like portion which is arranged on the minus side of the second joint portion 231 in the X axis direction, and extends in the Y axis direction. The second joint portion 231b is an elongated plate-like portion which is arranged on the plus side of the second joint portion 231 in the Y axis direction, and extends in the X axis direction. The second joint portion 231c is an elongated plate-like portion which is arranged on the plus side of the second joint portion 231 in the X axis direction, and extends in the Y axis direction. The second joint portion 231d is an elongated plate-like portion which is arranged on the minus side of the second joint portion 231 in the Y axis direction, and extends in the X axis direction.

The second joint portion 231a is joined to the first joint portion 133a by thermal welding, the second joint portion 231b is joined to the first joint portion 133b by thermal welding, the second joint portion 231c is joined to the first joint portion 133c by thermal welding, and the second joint portion 231d is joined to the first joint portion 133d by thermal welding. Due to such operations, the weld portion 11 described later is formed.

Next, the configuration of the energy storage unit 30 is described in detail.

Figure 5:
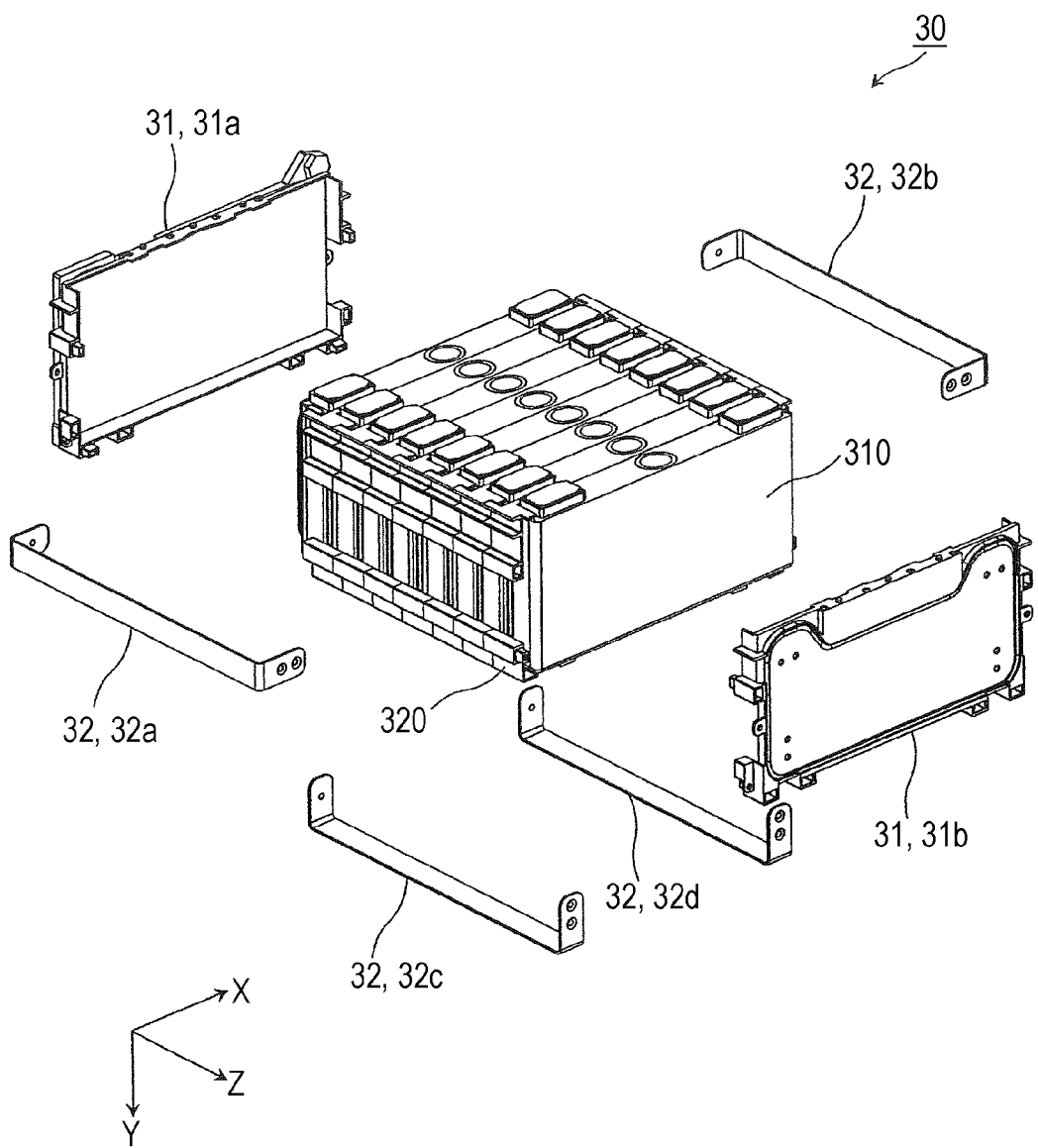
FIG. 5 is a perspective view showing a configuration of an energy storage unit.

FIG. 5 is a perspective view showing the configuration of the energy storage unit 30. To be more specific, FIG. 5 is an exploded perspective view showing respective elements of the energy storage unit 30 in an exploded manner.

In FIG. 5, for the sake of convenience of the description, the Y axis direction is indicated as the vertical direction, and the description is made by assuming the Y axis direction as the vertical direction in some places of this specification. However, in an actual mode of use, the Y axis direction is not limited to the vertical direction. The same understanding goes for FIG. 6.

As shown in FIG. 5, the energy storage unit 30 includes: a plurality of energy storage devices 310 (eight energy storage devices 310 in this embodiment); a plurality of spacers 320 (seven spacers 320 in this embodiment); two sandwiching members 31; and four binding members 32.

The energy storage device 310 is a secondary battery (battery) which can charge electricity therein or can discharge electricity therefrom. To be more specific, the energy storage device 310 is a non-aqueous electrolytic secondary battery such as a lithium ion secondary battery, and is a heat-susceptible object which causes lowering of functions thereof with heat. The energy storage device 310 is not limited to a non-aqueous electrolytic secondary battery, and may be a secondary battery other than a non-aqueous electrolytic secondary battery or may be a capacitor. The energy storage devices 310 which the energy storage unit 30 includes may not be used in plural, and the energy storage unit 30 may include only one energy storage device 310.

A spacer 320 is a plate-like member having insulating property which is arranged between two energy storage devices 310 arranged adjacently to each other. The spacer 320 provides insulation between two energy storage devices 310, and is formed using a resin or the like. To be more specific, the spacer 320 is a resin-made frame body formed using an insulating resin such as polycarbonate or polypropylene (PP), for example, and is also a heat-susceptible object which causes lowering of functions thereof with heat. In this embodiment, seven spacers 320 are arranged between eight energy storage devices 310.

The sandwiching member 31 is formed of a pair of planar members consisting of sandwiching members 31a and 31b, and holds the plurality of energy storage devices 310 (and the plurality of spacers 320) such that the sandwiching members 31a and 31b sandwich the plurality of energy storage devices 310 (and the plurality of spacers 320) from both sides of the energy storage unit 30 in the arrangement direction (Z axis direction) of the plurality of energy storage devices 310. In this embodiment, although the sandwiching member 31 is formed of a member made of metal such as stainless steel or aluminum, for example, the insulating property between the sandwiching member 31 and the energy storage device 310 is ensured by arranging a resin-made frame body between the sandwiching member 31 and the energy storage device 310 arranged adjacently to the sandwiching member 31. The resin-made frame body arranged between the sandwiching member 31 and the energy storage device 310 is also a heat-susceptible object which causes lowering of functions thereof with heat.

A binding member 32 has both ends thereof mounted on the pair of sandwiching members 31a and 31b so as to bind the plurality of energy storage devices 310 (and the plurality of spacers 320) together. That is, the binding member 32 is arranged so as to straddle over the plurality of energy storage devices 310 thus imparting a binding force in the arrangement direction (Z axis direction) of the plurality of energy storage devices 310 to the plurality of energy storage devices 310.

In this embodiment, the binding member 32 is formed of binding members 32a to 32d. The binding members 32a and 32b are arranged on both sides of the plurality of energy storage devices 310 (both sides in the X axis direction), and bind the plurality of energy storage devices 310 together by sandwiching the plurality of energy storage devices 310 from both sides. Further, the binding members 32c and 32d are arranged on lower sides of the plurality of energy storage devices 310 (on the plus side in the Y axis direction), and bind the plurality of energy storage devices 310 together from below.

Bus bars or the like which electrically connect the energy storage devices 310 to each other are also arranged on the energy storage unit 30. However, the detailed description of such members is omitted.

Next, the configuration of the energy storage device 310 is described in detail.

Figure 6:
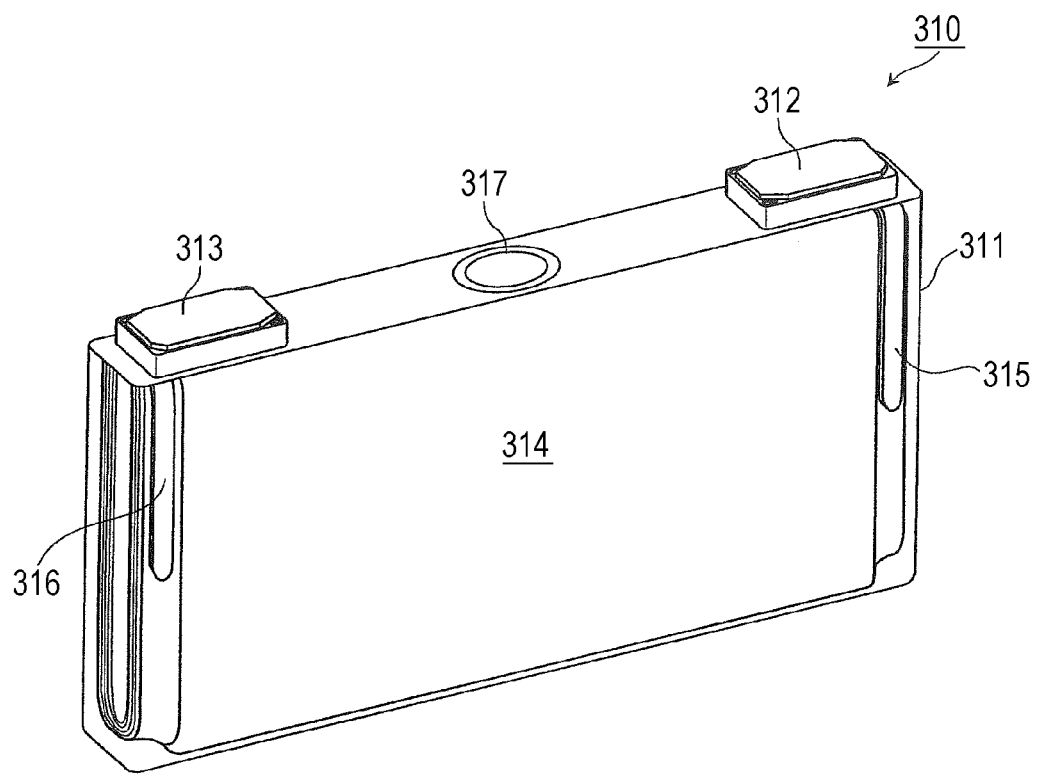
FIG. 6 is a perspective view showing a configuration of an energy storage device.

FIG. 6 is a perspective view showing the configuration of the energy storage device 310. To be more specific, FIG. 6 is a perspective view showing the inside of the energy storage device 310 in a see-through manner by passing through the container 311 of the energy storage device 310.

As shown in FIG. 6, the energy storage device 310 includes: the container 311; the positive electrode terminal 312; and the negative electrode terminal 313. An electrode assembly 314, a positive electrode collector 315 and a negative electrode collector 316 are arranged in the container 311. A liquid such as an electrolytic solution is sealed in the container 311. However, the illustration of the liquid is omitted.

The container 311 is constituted of: a bottomed body made of metal and having a rectangular cylindrical shape; and a metal-made lid portion (a surface portion on the minus side in the Y axis direction) which closes an opening of the body. The container 311 is configured to seal the inside thereof by accommodating the electrode assembly 314 and the like in the inside thereof and joining the lid portion and the body to each other by welding or the like. A safety valve 317 is arranged on the lid portion of the container 311 so as to release a pressure in the container 311 when the pressure is increased.

A resin-made packing is arranged at portions of the lid portion of the container 311 where the positive electrode terminal 312, the negative electrode terminal 313, the positive electrode collector 315 and the negative electrode collector 316 are mounted respectively. In a state where the energy storage unit 30 is arranged on the first outer covering 100, out of the plurality of energy storage devices 310 which the energy storage unit 30 includes, the lid portion of the container 311 of the energy storage device 310 which is positioned at the lowermost portion (an end portion on the minus side in the Z axis direction) is arranged so as to face the weld portion 11 described later in an opposed manner, and the first projecting portion 131d is arranged between the lid portion and the weld portion 11.

The electrode assembly 314 is a power generating element which includes a positive electrode, a negative electrode and a separator, and can store electricity. To be more specific, the electrode assembly 314 is a winding-type electrode assembly formed by winding a layered body where the separator is sandwiched between the positive electrode and the negative electrode. The electrode assembly 314 may be a stacked-type electrode assembly formed by stacking plate-shaped electrode plates.

The positive electrode is an electrode plate where a positive electrode active substance layer is formed on a surface of an elongated strip-shaped conductive positive electrode collector foil made of aluminum, an aluminum alloy or the like. The negative electrode is an electrode plate where a negative electrode active substance layer is formed on a surface of an elongated strip-shaped conductive negative electrode collector foil made of copper, a copper alloy or the like. The separator is a sheet having minute pores. The positive electrode, the negative electrode and the separator which are used in the energy storage device 310 are not particularly different from positive electrodes, negative electrodes and separators used conventionally. Provided that the performance of the energy storage device 310 is not impaired, known materials can be used as desired. Provided that the performance of the energy storage device 310 is not impaired, a kind of electrolytic solution (non-aqueous electrolyte) sealed in the container 311 is not particularly limited, and various electrolytic solutions can be selected.

The positive electrode terminal 312 is an electrode terminal which is electrically connected to a positive electrode of the electrode assembly 314 by way of the positive electrode collector 315, and the negative electrode terminal 313 is an electrode terminal which is electrically connected to a negative electrode of the electrode assembly 314 by way of the negative electrode collector 316. That is, the positive electrode terminal 312 and the negative electrode terminal 313 are metal-made electrode terminals for leading out electricity stored in the electrode assembly 314 to an external space of the energy storage device 310 and leading electricity into an inner space of the energy storage device 310 for storing electricity in the electrode assembly 314 respectively.

The plurality of energy storage devices 310 in the energy storage unit 30 are connected to each other in series or in parallel through the positive electrode terminals 312 and the negative electrode terminals 313. The positive electrode terminal 312 of any one of the energy storage devices 310 is connected to the positive external terminal 21 formed on the first outer covering 100, and the negative electrode terminal 313 of any one of the energy storage devices 310 is connected to the negative external terminal 22 formed on the first outer covering 100.

The positive electrode collector 315 is a member having conductivity and rigidity which is arranged between the positive electrode of the electrode assembly 314 and a side wall of the container 311, and is electrically connected to the positive electrode terminal 312 and the positive electrode. In the same manner as the positive electrode collector foil used in the positive electrode, the positive electrode collector 315 is formed using aluminum, an aluminum alloy or the like. The negative electrode collector 316 is a member having conductivity and rigidity which is arranged between the negative electrode of the electrode assembly 314 and the side wall of the container 311, and is electrically connected to the negative electrode terminal 313 and the negative electrode of the electrode assembly 314. In the same manner as the negative electrode collector foil used in the negative electrode, the negative electrode collector 316 is formed using copper, a copper alloy or the like.

Next, the configuration of the electric equipment 40 is described in detail.

Figure 7:
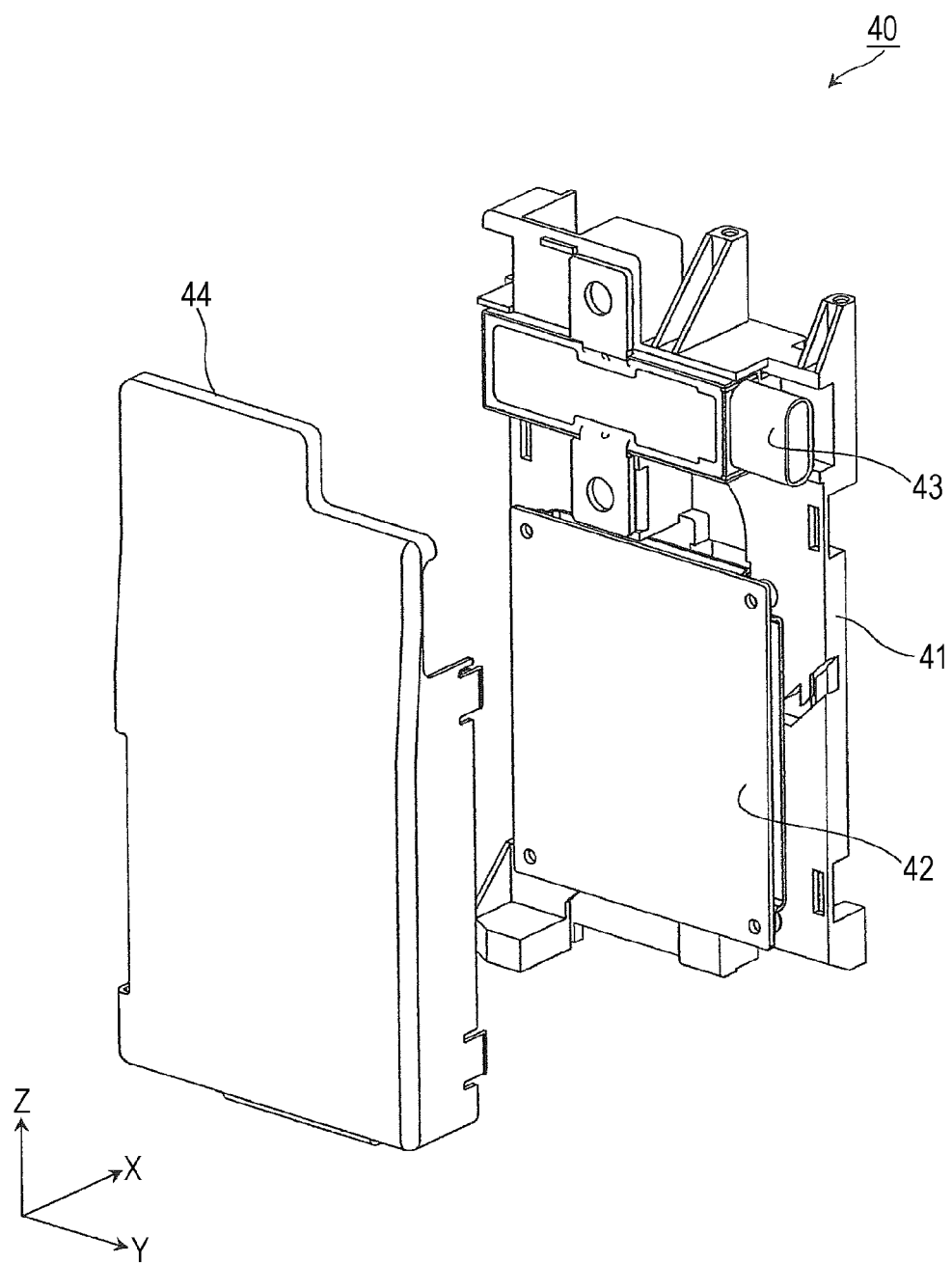
FIG. 7 is a perspective view showing a configuration of electric equipment.

FIG. 7 is a perspective view showing the configuration of the electric equipment 40. To be more specific, FIG. 7 shows the inside of the electric equipment 40 in a state where a cover 44 of the electric equipment 40 is removed.

The electric equipment 40 is a heat-susceptible object which causes lowering of functions thereof with heat. To be more specific, as shown in FIG. 7, the electric equipment 40 includes: a support base 41; a printed circuit board 42 and a relay 43 arranged on the support base 41; and the cover 44 which covers the printed circuit board 42 and the relay 43.

The support base 41 is a flat plate-like member on which the printed circuit board 42 and the relay 43 are mounted. That is, the printed circuit board 42 and the relay 43 are mounted on the support base 41 and, thereafter, the cover 44 is mounted on the support base 41 thus providing the electric equipment 40 where the printed circuit board 42 and the relay 43 are accommodated in a space defined by the support base 41 and the cover 44.

The support base 41 and the cover 44 are formed using an insulating material such as a resin. Accordingly, by accommodating the printed circuit board 42 and the relay 43 in the space defined by the support base 41 and the cover 44, it is possible to prevent the printed circuit board 42 and the relay 43 from coming into contact with a metal member or the like disposed outside the electric equipment 40.

The printed circuit board 42 is electric equipment which is electrically connected to at least one energy storage device 310 out of the energy storage devices 310 which the energy storage unit 30 includes. The printed circuit board 42 is a heat-susceptible object which causes lowering of functions thereof with heat. The relay 43 is also a heat-susceptible object which causes lowering of functions thereof with heat.

To be more specific, the printed circuit board 42 is a control circuit board for controlling a charge state, a discharge state (a battery state such as a voltage or a temperature) and the like of the plurality of energy storage devices 310 by acquiring and monitoring the charge state, the discharge state and the like of the plurality of energy storage devices 310. The printed circuit board 42 is connected to the positive electrode terminals 312 or the negative electrode terminals 313 of the plurality of energy storage devices 310 through lines (lead lines). The printed circuit board 42 includes a control circuit (not shown in the drawing) for performing such monitoring, turning on/off of the relay 43 and the communication with other equipment, for example.

The printed circuit board 42 is arranged between the energy storage devices 310 and the weld portion 11 described later in the energy storage unit 30 at a position closer to the weld portion 11 than the energy storage devices 310. To be more specific, in a state where the electric equipment 40 is arranged on the first outer covering 100, the printed circuit board 42 is arranged in the vicinity of the weld portion 11 (to be more specific, directly on a lateral side of the weld portion 11), and the first projecting portion 131a is arranged between the printed circuit board 42 and the weld portion 11.

The electric equipment 40 may include a different heat-susceptible object such as an inverter circuit in addition to the printed circuit board 42 and the relay 43 described above. Alternatively, the electric equipment 40 may include a member formed using a material having a melting point (or a glass transition temperature) lower than a predetermined temperature as a heat-susceptible object or the like.

Next, a method of manufacturing the energy storage apparatus 1 by joining the first outer covering 100 and the second outer covering 200 to each other by thermal welding is described in detail with reference to FIG. 8 to FIG. 10.

Figure 8:
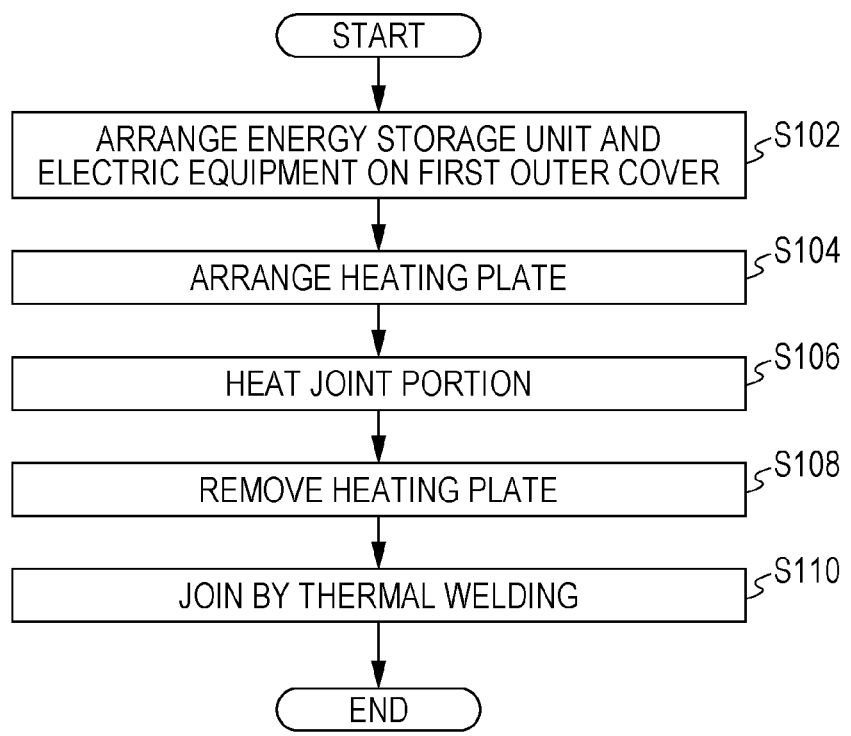
FIG. 8 is a flow chart showing a method of manufacturing the energy storage apparatus.

FIG. 8 is a flow chart showing the method of manufacturing the energy storage apparatus 1. To be more specific, FIG. 8 shows the method of manufacturing the energy storage apparatus 1 by joining the first outer covering 100 and the second outer covering 200 to each other by thermal welding.

As shown in the drawing, the energy storage unit 30 and the electric equipment 40 are arranged on the first outer covering 100 (S102).

Figure 9:
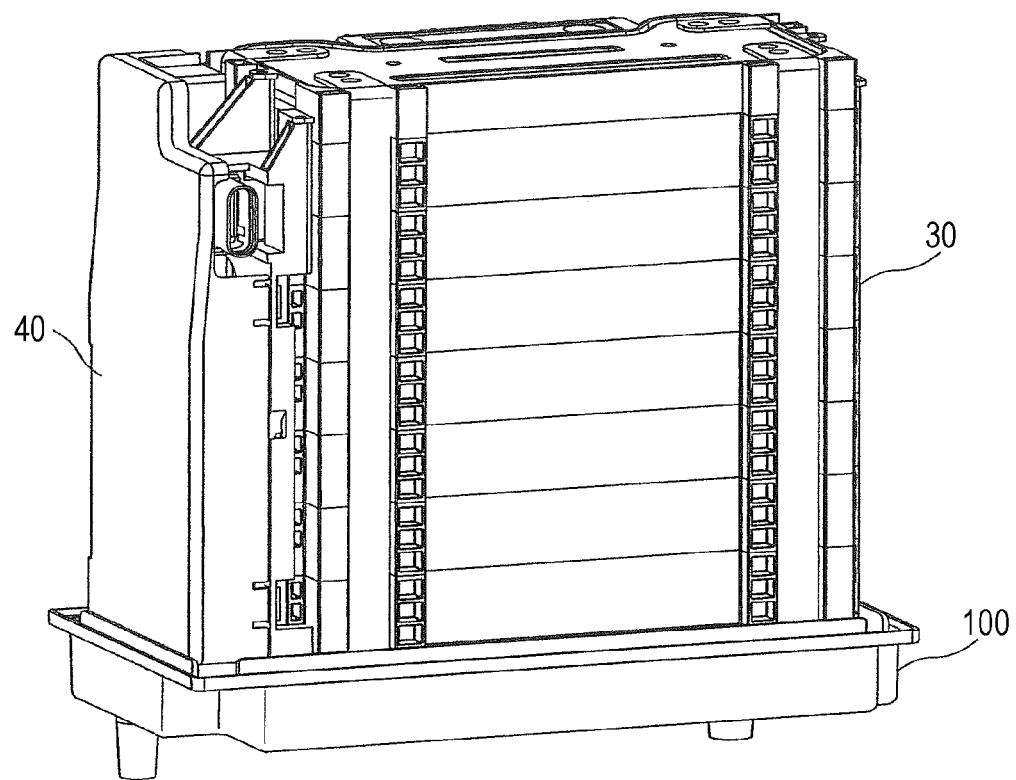
FIG. 9 is a perspective view showing a situation where the energy storage unit and the electric equipment are arranged on the first outer covering.

To be more specific, as shown in FIG. 9, the energy storage unit 30 and the electric equipment 40 are arranged on the first flat surface portion 110 of the first outer covering 100 such that the energy storage unit 30 and the electric equipment 40 are arranged parallel to each other in the X axis direction. FIG. 9 is a perspective view showing a situation where the energy storage unit 30 and the electric equipment 40 are arranged on the first outer covering 100.

In this embodiment, when the electric equipment 40 is arranged above or below the energy storage unit 30, there arises a possibility that the electric equipment 40 is damaged due to vibrations of the energy storage apparatus 1. Accordingly, it is preferable that the electric equipment 40 be arranged on a lateral side of the energy storage unit 30 (in the X axis direction or in the Y axis direction). Further, to avoid heat of an exhaust gas discharged from the safety valve 317 of the energy storage device 310 which the energy storage unit 30 includes from affecting the electric equipment 40, it is preferable that the electric equipment 40 be arranged on a lateral side of the energy storage unit 30 where the safety valves 317 are not arranged out of lateral sides of the energy storage unit 30. In view of the above, in this embodiment, the electric equipment 40 is arranged on the lateral side of the energy storage unit 30 in the X axis direction. The electric equipment 40 may be arranged on the lateral side of the energy storage unit 30 where the safety valves 317 are not arranged out of lateral sides of the energy storage unit 30 in the Y axis direction.

Returning to FIG. 8, a heating plate is arranged on the first joint portion 133 of the first connecting portion 130 of the first outer covering 100 (S104).

Figure 10A:
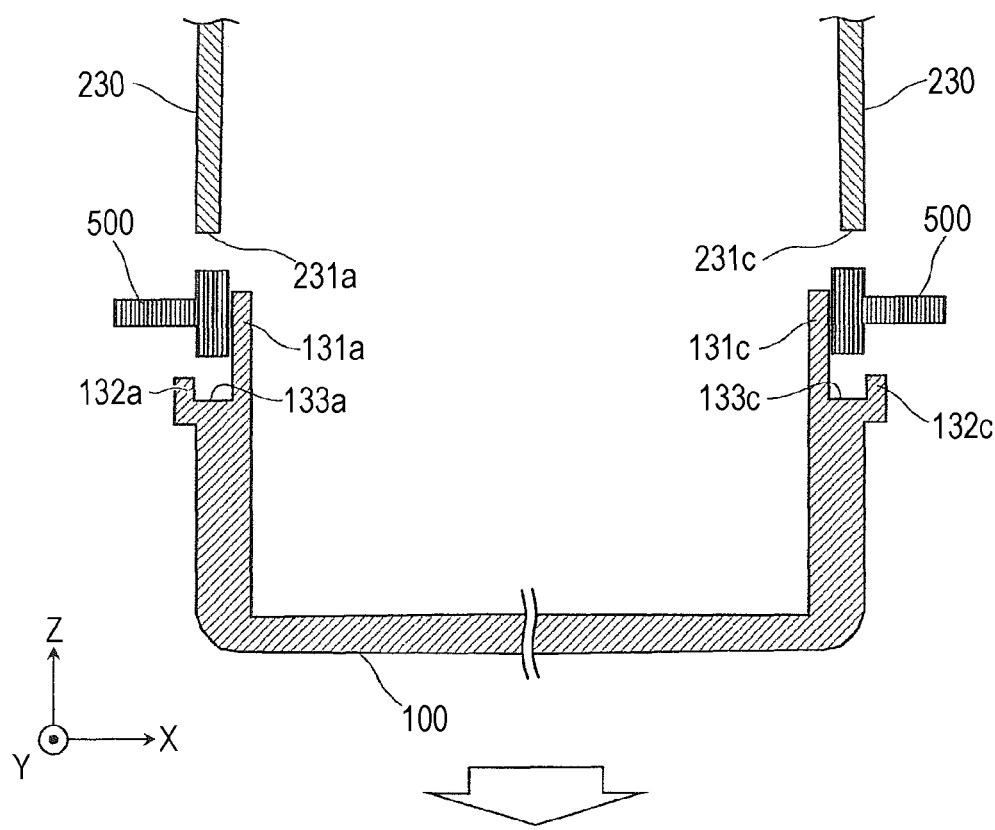
FIGS. 10A and 10B are cross-sectional views showing a situation where thermal welding is performed in a state in which a heating plate is arranged on the outer covering.
Figure 10B:
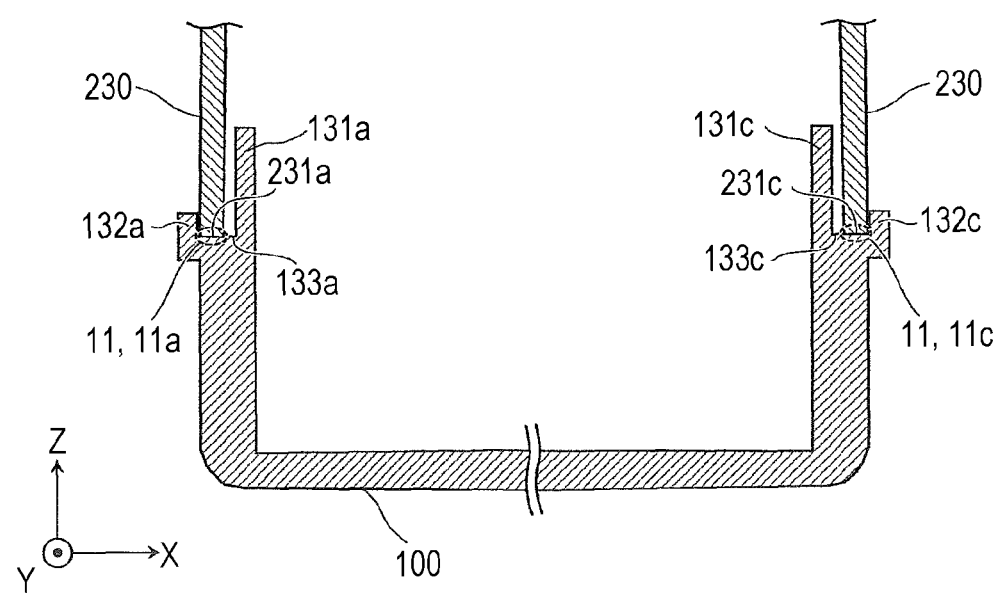

To be more specific, as shown in FIG. 10A, a heating plate 500 which is a metal member heated to approximately 300° C. is arranged on the first joint portion 133 of the first outer covering 100 (on the first joint portions 133a and 133c in FIG. 10A). FIG. 10A and FIG. 10B are cross-sectional views showing the configuration where thermal welding is performed in a state where the heating plate is arranged on the outer covering 10 according to the embodiment of the present invention.

The first projecting portion 131 is formed such that a length (height) of the first projecting portion 131 in the Z axis direction is larger than a length of a distal end portion of the heating plate 500 (a portion which is brought into contact with the first joint portion 133 and the second joint portion 231) in the Z axis direction. That is, the first projecting portion 131 is formed such that, in a state where a lower surface of the distal end portion of the heating plate 500 is brought into contact with the first joint portion 133, the height of the first projecting portion 131 is larger than the height of the distal end portion of the heating plate 500. With such a configuration, the influence of heat of the heating plate 500 exerted on the heat-susceptible object can be reduced by the first projecting portion 131.

A length (height) of the energy storage unit 30 in the Z axis direction is larger (higher) than a length (height) of the first outer covering 100 as well as a length (height) of the second outer covering 200. Accordingly, in performing thermal welding, to prevent the interference of the heating plate 500 with the energy storage unit 30, the heating plate 500 is formed into an integral frame shape (rectangular annular shape), is fit on the energy storage unit 30, and the heating plate 500 is moved to a predetermined position.

The heating plate 500 may not be formed into an integral body. It is sufficient for the heating plate 500 to have a frame shape as a whole even when the heating plate 500 has the two-split structure or the four-split structure. For example, the heating plate 500 may be formed by combining two two-split members (members having a U-shape) obtained by splitting a rectangular annular member in two. The heating plate 500 may be formed by combining a member having a shape where one side of a rectangular annular shape is omitted (member having a U-shape) with a member having an I-shape. The heating plate 500 may be formed by combining two members having an L-shape respectively. The heating plate 500 may be formed by combining four members having an I shape respectively.

Returning to FIG. 8, a joint portion between the first outer covering 100 and the second outer covering 200 is heated (S106). That is, in a heating step, the joint portion between the first outer covering 100 and the second outer covering 200 which is arranged so as to sandwich the heat shielding portion between the joint portion and the heat-susceptible object is heated.

To be more specific, the heating plate 500 shown in FIG. 10A is pressed to the first joint portion 133 of the first outer covering 100 which is arranged to sandwich the first projecting portion 131 between the first joint portion 133 and the energy storage unit 30 and the second joint portion 231 of the second outer covering 200. Accordingly, the first joint portion 133 and the second joint portion 231 (the first joint portions 133a, 133c and the second joint portions 231a, 231c in FIG. 10A) are heated. Provided that the first joint portion 133 and the second joint portion 231 can be heated, the present invention is not limited to the configuration of pressing the heating plate 500 to the first joint portion 133 and the second joint portion 231. Any configuration may be adopted such as a configuration where the first joint portion 133 and the second joint portion 231 are heated by laser radiation, ultrasonic welding, friction heat or the like.

Returning to FIG. 8, the heating plate 500 is removed (S108). That is, the first outer covering 100 and the second outer covering 200 are temporarily moved from a state where the heating plate 500 is pressed to the first outer covering 100 and the second outer covering 200 so as to be separated from each other in the Z axis direction, and the heating plate 500 is removed.

Then, the first outer covering 100 and the second outer covering 200 are joined to each other by thermal welding at the joint portion (S110). That is, in the joining step, the first connecting portion 130 of the first outer covering 100 and the second connecting portion 230 of the second outer covering 200 are joined to each other by thermal welding at the joint portion.

To be more specific, as shown in FIG. 10B, the first outer covering 100 and the second outer covering 200 are made to approach each other and are brought into contact with each other again and hence, the first joint portion 133 of the first outer covering 100 and the second joint portion 231 of the second outer covering 200 are joined to each other by thermal welding. With such operations, the weld portion 11 is formed. That is, as shown in FIG. 10B, the first joint portions 133a and 133c and the second joint portions 231a and 231c are joined to each other thus forming weld portions 11a and 11c. In the same manner, the first joint portions 133b and 133d and the second joint portions 231b and 231d are joined to each other thus forming weld portions 11b and 11d.

In this manner, the weld portion 11 is neither a weld portion formed on a distal end of the first projecting portion 131 nor a weld portion formed on a distal end of the second projecting portion 132 (that is, a distal end of the first outer covering 100 not being welded) but is a weld portion formed on the first joint portion 133 formed between a proximal end of the first projecting portion 131 and a proximal end of the second projecting portion 132.

In the heating step (S106 in FIG. 8), either one of the first joint portion 133 or the second joint portion 231 may be heated by pressing the heating plate 500 to either one of the first joint portion 133 or the second joint portion 231. Also with such a configuration, in the joining step (S110 in FIG. 8), the first joint portion 133 and the second joint portion 231 can be joined to each other by thermal welding thus forming the weld portion 11.

It may be possible to adopt the configuration where a protrusion which protrudes upward (toward the plus side in the Z axis direction) is formed on the first joint portion 133, and welding is performed by melting the protrusion with heat of the heating plate 500. In the same manner, the second joint portion 231 may adopt a configuration where a protrusion which protrudes downward (toward the minus side in the Z axis direction) is formed on the second joint portion 231, and welding is performed by the protrusion.

The first outer covering 100 and the second outer covering 200 may be jointed to each other such that the energy storage unit 30 and the electric equipment 40 are arranged in the second outer covering 200 and, thereafter, the first outer covering 100 and the second outer covering 200 are joined to each other by thermal welding by heating a joint portion between the first outer covering 100 and the second outer covering 200.

The first outer covering 100 and the second outer covering 200 are joined to each other in accordance with the above-mentioned steps so as to manufacture the energy storage apparatus 1. The description is made with respect to the positional relationship between the first outer covering 100, the second outer covering 200, the energy storage unit 30 and the electric equipment 40 in a state where the first outer covering 100 and the second outer covering 200 are joined to each other.

Figure 11:
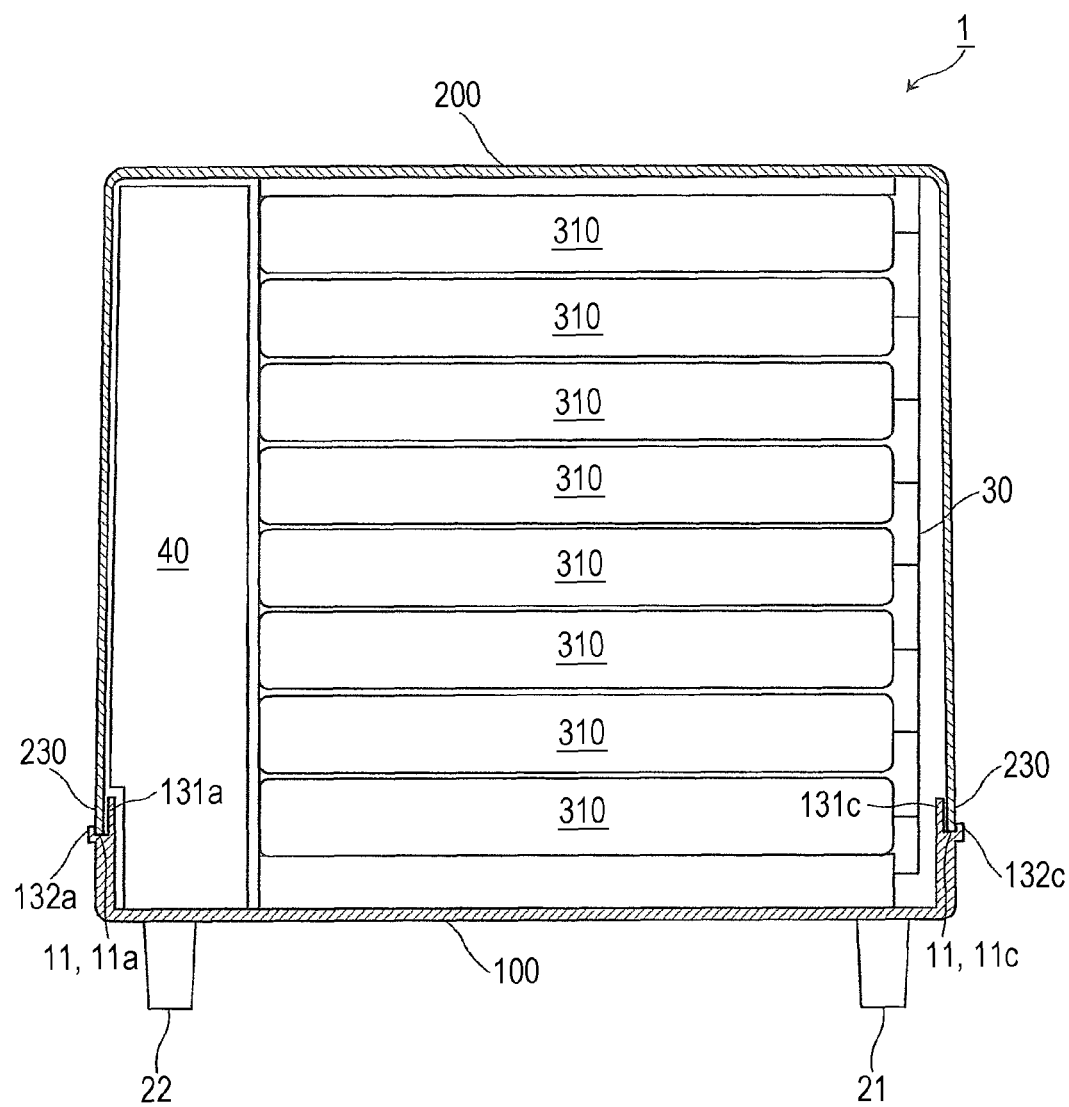
FIG. 11 is a cross-sectional view showing the positional relationship between the first outer covering, the second outer covering, the energy storage unit and the electric equipment.

FIG. 11 is a cross-sectional view showing the positional relationship between the first outer covering 100, the second outer covering 200, the energy storage unit 30 and the electric equipment 40.

As shown in FIG. 11, the first outer covering 100 and the second outer covering 200 are joined to each other so that the first joint portion 133 and the second joint portion 231 are joined to each other thus forming the weld portion 11 (weld portions 11a and 11c in FIG. 11). That is, the weld portion 11 is a joint portion between the first outer covering 100 and the second outer covering 200 which is formed by joining the first outer covering 100 and the second outer covering 200 to each other by thermal welding.

The first projecting portion 131a of the first outer covering 100 is arranged between the weld portion 11a and a heat-susceptible object such as the printed circuit board 42 in the electric equipment 40. To be more specific, the printed circuit board 42 is arranged in the vicinity of the plus side of the weld portion 11a (directly on a lateral side of the weld portion 11a) in the X axis direction such that the printed circuit board 42 faces the weld portion 11a in an opposed manner. The first projecting portion 131a is arranged between the printed circuit board 42 and the weld portion 11a.

The first projecting portion 131c is arranged between the weld portion 11c and a heat-susceptible object such as the energy storage device 310 in the energy storage unit 30. The same goes for the first projecting portions 131b and 131d. To be more specific, the energy storage device 310 disposed at the lowermost portion (an end portion on the minus side in the Z axis direction) of the energy storage unit 30 is arranged so as to face the weld portions 11b to 11d (the weld portion 11b being the weld portion on the plus side in the Y axis direction, and the weld portion 11d being the weld portion on the minus side in the Y axis direction) in an opposed manner. The energy storage device 310 disposed at the lowermost portion is arranged such that the lid portion of the container 311 faces the weld portion 11d in an opposed manner, and the first projecting portion 131d is arranged between the lid portion and the weld portion 11d.

In this manner, the first projecting portion 131 is a heat shielding portion for shielding heat generated when the first outer covering 100 and the second outer covering 200 are joined to each other by thermal welding, and the first projecting portion 131 is arranged between the weld portion 11 and the heat-susceptible object.

The first projecting portion 131a is arranged away from the electric equipment 40. That is, in arranging the electric equipment 40 on the first outer covering 100, the electric equipment 40 is arranged away from the first projecting portion 131a. For example, a rib projecting toward the electric equipment 40 is formed on the first outer covering 100, and the rib is brought into contact with the cover 44 of the electric equipment 40 so that the first projecting portion 131a and the electric equipment 40 (printed circuit board 42) can be arranged away from each other. Alternatively, by further mounting a cover on the electric equipment 40, or by simply arranging the first projecting portion 131a and the electric equipment 40 away from each other, the first projecting portion 131a and the electric equipment 40 (printed circuit board 42) can be arranged away from each other.

The first projecting portion 131c is arranged away from the energy storage unit 30. For example, in the same manner as described above, a rib projecting toward the energy storage unit 30 is formed on the first outer covering 100, and the rib is brought into contact with the energy storage unit 30 so that the first projecting portion 131c and the energy storage unit 30 (energy storage device 310) can be arranged away from each other. Alternatively, by further mounting a cover on the energy storage unit 30, or by simply arranging the first projecting portion 131c and the energy storage unit 30 away from each other, the first projecting portion 131c and the energy storage unit 30 (energy storage device 310) can be arranged away from each other.

In this manner, the heat shielding portion is arranged away from the heat-susceptible object. The same goes for the first projecting portions 131b and 131d.

As described above, according to the energy storage apparatus 1 of the embodiment of the present invention, the heat shielding portion for shielding heat is provided between the weld portion 11 which is the joint portion formed by joining the first outer covering 100 and the second outer covering 200 to each other by thermal welding and the heat-susceptible object which causes lowering of functions thereof with heat. Accordingly, even when the outer covering 10 is joined by thermal welding, heat generated by thermal welding can be shielded by the heat shielding portion and hence, it is possible to reduce an effect which heat generated by welding exerts on the heat-susceptible object.

To be more specific, the heat-susceptible object includes the printed circuit board 42 and hence, it is possible to reduce an effect which heat generated by joining the first outer covering 100 and the second outer covering 200 to each other by thermal welding exerts on the printed circuit board 42.

To be more specific, the printed circuit board 42 is arranged at the position closer to the weld portion 11 than the energy storage device 310 (in the vicinity of the weld portion 11). However, the heat shielding portion is arranged between the printed circuit board 42 and the weld portion 11 and hence, it is possible to reduce an effect which heat generated by thermal welding exerts on the printed circuit board 42.

The heat-susceptible object is the non-aqueous electrolytic secondary battery forming the energy storage device 310 and hence, it is possible to reduce an effect which heat generated by thermal welding exerts on the non-aqueous electrolytic secondary battery which is weak to heat.

The energy storage device 310 disposed at the lowermost portion (the end portion on the minus side in the Z axis direction) of the energy storage unit 30 is arranged such that the lid portion of the container 311 faces the weld portion 11 in an opposed manner, and a resin-made packing which is weak to heat is arranged on the lid portion of the container 311. Accordingly, it is possible to reduce an effect which heat generated by thermal welding exerts on the packing by arranging the heat shielding portion between the energy storage device 310 and the weld portion 11 and hence.

The heat-susceptible object includes the resin-made frame body such as the spacer 320 and hence, it is possible to reduce an effect which heat generated by thermal welding exerts on the frame body which is weak to heat.

In the energy storage apparatus 1, the heat shielding portion can be easily formed by forming the first projecting portion 131 which projects toward the second outer covering 200 on the first outer covering 100 as the heat shielding portion. Further, with the formation of the first projecting portion 131, it is sufficient to fit the second outer covering 200 on the first outer covering 100 along the first projecting portion 131 at the time of arranging the second outer covering 200 on the first outer covering 100 and hence, positioning of the second outer covering 200 to the first outer covering 100 can be easily performed.

The second projecting portion 132 is further provided to the energy storage apparatus in addition to the first projecting portion 131 and hence, the alignment between the first outer covering 100 and the second outer covering 200 can be easily performed using the first projecting portion 131 and the second projecting portion 132. Further, the weld portion 11 can be concealed by the second projecting portion 132 such that the weld portion 11 is not exposed to the outside of the energy storage apparatus 1 and hence, the external appearance of the energy storage apparatus can be enhanced.

Out of the first projecting portion 131 and the second projecting portion 132 which sandwich the weld portion 11 therebetween, the first projecting portion 131 has a larger height. That is, it is sufficient that the first projecting portion 131 carries out a function of the heat shielding portion, and it is unnecessary to form the second projecting portion 132 with a large height. Accordingly, the first projecting portion 131 has a larger height than the second projecting portion 132. With such a configuration, it is possible to reduce an effect which heat generated by thermal welding exerts on the heat-susceptible object.

When the second projecting portion 132 has a large height, there is a possibility that heat of the heating plate 500 remains in the inside of the energy storage apparatus 1 due to a wall formed of the second projecting portion 132. In view of the above, by forming the second projecting portion 132 having a small height, the undesired transfer of heat of the heating plate 500 to the inside of the energy storage apparatus 1 can be suppressed.

The first projecting portion 131 is annularly formed on the end portion of the first outer covering 100 and hence, the transfer of heat to the inside of the first projecting portion 131 which is formed into an annular shape can be suppressed whereby it is possible to reduce an effect which heat generated by thermal welding exerts on the heat-susceptible object.

The heat shielding portion is arranged away from the heat-susceptible object and hence, the transfer of heat generated by thermal welding to the heat-susceptible object through the heat shielding portion can be suppressed whereby it is possible to reduce an effect which the heat exerts on a heat-susceptible object. Further, it is possible to suppress the case where the heat shielding portion impinges on the heat-susceptible object due to vibrations or the like thus damaging the heat-susceptible object.

According to the method of manufacturing the energy storage apparatus 1 according to the embodiment of the present invention, the joint portion between the first outer covering 100 and the second outer covering 200 arranged so as to sandwich the heat shielding portion between the joint portion and the heat-susceptible object is heated, and the first outer covering 100 and the second outer covering 200 are joined to each other by thermal welding at the joint portion. Accordingly, even when joining of the outer coverings 10 is performed by thermal welding, it is possible to suppress the transfer of heat generated by thermal welding to the heat-susceptible object by the heat shielding portion and hence, it is possible to reduce an effect which the heat exerts on the heat-susceptible object.

(Modification 1)

Next, a modification 1 of the above-mentioned embodiment is described. In the above-mentioned embodiment, the first outer covering 100 includes two ribs consisting of the first projecting portion 131 and the second projecting portion 132. In this modification, however, a first outer covering does not include the second projecting portion 132.

Figure 12:
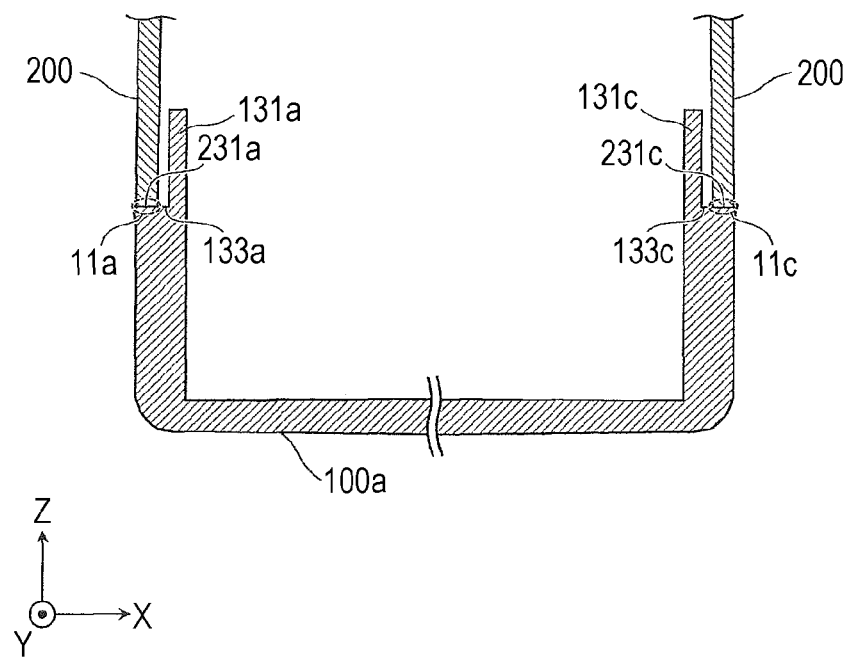
FIG. 12 is a cross-sectional view showing a configuration of a first outer covering and a second outer covering according to a modification 1 of the embodiment of the present invention.

FIG. 12 is a cross-sectional view showing a configuration of a first outer covering 100a and a second outer covering 200 according to the modification 1 of the embodiment of the present invention.

As shown in FIG. 12, although the first outer covering 100a includes the first projecting portion 131 (first projecting portions 131a and 131c in FIG. 12), the first outer covering 100a does not include the second projecting portion 132 employed in the above-mentioned embodiment.

In the same manner as the above-mentioned embodiment, a weld portion 11 (weld portions 11a and 11c in FIG. 12) is formed by joining a first joint portion 133 (first joint portions 133a and 133c in FIG. 12) of the first outer covering 100a and a second joint portion 231 (second joint portions 231a and 231c in FIG. 12) of the second outer covering 200 to each other by thermal welding.

As described above, also in the energy storage apparatus of this modification, advantageous effects substantially equal to the advantageous effects of the above-mentioned embodiment can be acquired. Particularly, the second projecting portion 132 is not formed on the first outer covering 100a and hence, the first outer covering 100a can be easily manufactured.

(Modification 2)

Next, a modification 2 of the above-mentioned embodiment is described. In the above-mentioned modification 1, the first outer covering 100a does not include the second projecting portion although the first outer covering 100a includes the first projecting portion 131, and the second outer covering 200 also does not include a projecting portion. In this modification, however, the second outer covering includes a second projecting portion.

Figure 13:
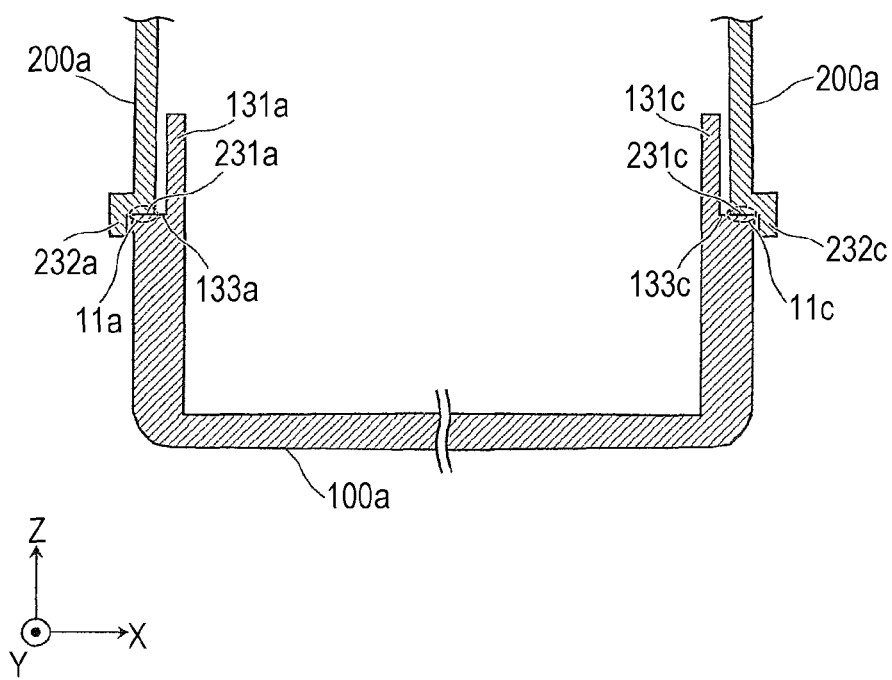
FIG. 13 is a cross-sectional view showing configurations of a first outer covering and a second outer covering according to a modification 2 of the embodiment of the present invention.

FIG. 13 is a cross-sectional view showing a configuration of a first outer covering 100a and a second outer covering 200a according to the modification 2 of the embodiment of the present invention.

As shown in FIG. 13, the first outer covering 100a includes a first projecting portion 131 (first projecting portions 131a and 131c in FIG. 13), and the second outer covering 200a includes a second projecting portion 232 (second projecting portions 232a and 232c in FIG. 13). In this modification, the second projecting portion 232 has substantially the same shape as the second projecting portion 132 employed in the above-mentioned embodiment.

To be more specific, the second projecting portion 232 is an annular portion which projects in a downwardly extending manner toward the minus side in the Z axis direction from an outer side of a second joint portion 231 (second joint portions 231a and 231c in FIG. 13). That is, the second projecting portion 232 is an annular projecting portion (rib) which is formed on an edge portion of the second outer covering 200a on a first outer covering 100a side, and projects toward the first outer covering 100a.

In the same manner as the above-mentioned embodiment, a weld portion 11 (weld portions 11a and 11c in FIG. 13) is formed by joining a first joint portion 133 (first joint portions 133a and 133c in FIG. 13) of the first outer covering 100a and a second joint portion 231 (second joint portions 231a and 231c in FIG. 13) of the second outer covering 200a to each other by thermal welding. That is, the second projecting portion 232 is arranged so as to sandwich the first joint portion 133, the second joint portion 231 and the weld portion 11 between the second projecting portion 232 and the first projecting portion 131.

As described above, also in the energy storage apparatus of this modification, advantageous effects substantially equal to the advantageous effects of the above-mentioned embodiment can be acquired. Particularly, the second projecting portion 232 is formed on the second outer covering 200a and hence, the alignment between the first outer covering 100a and the second outer covering 200a can be easily performed. Further, the weld portion 11 can be concealed by the second projecting portion 232 such that the weld portion 11 is not exposed to the outside of the energy storage apparatus and hence, the external appearance of the energy storage apparatus can be enhanced.

(Modification 3)

Next, a modification 3 of the above-mentioned embodiment is described. In the above-mentioned embodiment, the first outer covering 100 forms the cover member, and the second outer covering 200 forms the housing. To the contrary, in this modification, a first outer covering forms a housing, and a second outer covering forms a cover member. That is, this modification provides an energy storage apparatus where the configuration of a joint portion of the cover member and the configuration of a joint portion of the housing are exchanged with each other.

Figure 14:
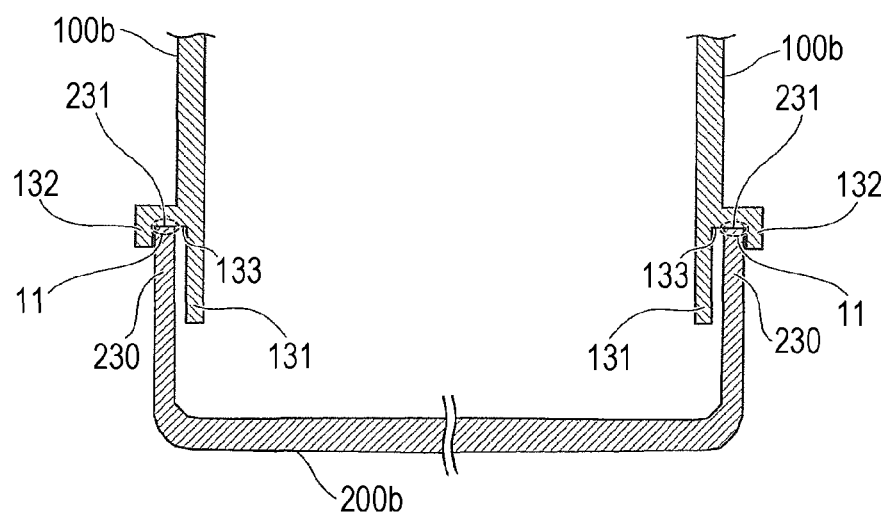
FIG. 14 is a cross-sectional view showing configurations of a first outer covering and a second outer covering according to a modification 3 of the embodiment of the present invention.
Figure 14:
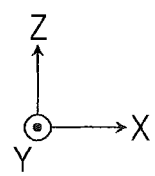

FIG. 14 is a cross-sectional view showing a configuration of the first outer covering 100b and the second outer covering 200b according to a modification 3 of the embodiment of the present invention.

As shown in FIG. 14, the first outer covering 100b is a housing of the energy storage apparatus in the same manner as the second outer covering 200 of the energy storage device of the above-mentioned embodiment. In the same manner as the first outer covering 100 of the above-mentioned embodiment, the first outer covering 100b includes: a first projecting portion 131; a second projecting portion 132; and a first joint portion 133. That is, the first outer covering 100b includes two ribs consisting of the first projecting portion 131 and the second projecting portion 132 which sandwich the first joint portion 133 therebetween.

The second outer covering 200b is a cover member of the energy storage apparatus in the same manner as the first outer covering 100 of the energy storage apparatus of the above-mentioned embodiment. On the other hand, in the same manner as the second outer covering 200 of the above-mentioned embodiment, a second connecting portion 230 has a second joint portion 231.

In the same manner as the above-mentioned embodiment, the first joint portion 133 of the first outer covering 100b and the second joint portion 231 of the second outer covering 200b are joined to each other by thermal welding thus forming a weld portion 11.

In the case of manufacturing the energy storage apparatus in accordance with the method of manufacturing an energy storage apparatus shown in FIG. 8, firstly, an energy storage unit 30 and an electric equipment 40 are arranged in the first outer covering 100b which forms the housing (S102) and, thereafter, the first outer covering 100b and the second outer covering 200b are joined to each other by thermal welding by heating a joint portion between the first outer covering 100b and the second outer covering 200b (S104 to S110). The first outer covering 100b and the second outer covering 200b may be joined to each other after the energy storage unit 30 and the electric equipment 40 are arranged on the second outer covering 200b which forms the cover member.

The above-mentioned modification 1 or 2 may be applied to the modification 3. That is, as in the case of the above-mentioned modification 1, the modification 3 may be configured such that the first outer covering 100b does not include the second projecting portion 132, and includes only the first projecting portion 131. Alternatively, as in the case of the above-mentioned modification 2, the modification 3 may be configured such that the first outer covering 100b does not include the second projecting portion 132, and the second outer covering 200b includes the second projecting portion.

As described above, also the energy storage apparatus of this modification can also acquire advantageous effects substantially equal to the advantageous effects of the above-mentioned embodiment.

(Modification 4)

Next, a modification 4 of the above-mentioned embodiment is described.

In this modification, a heat shielding portion includes a heat insulating portion formed using a heat insulating material. That is, in the energy storage apparatus, to suppress an effect which heat exerts on a heat-susceptible object, the heat insulating portion formed using a heat insulating material is arranged between the heat-susceptible object and a heat generation source.

For example, when a heat-susceptible object is the electric equipment 40 (or a printed circuit board 42 in the electric equipment 40 or the like), the heat shielding portion is a first projecting portion 131a or the like arranged between a weld portion 11 and the electric equipment 40. Further, when a heat-susceptible object is an energy storage unit 30 (or an energy storage device in the energy storage unit 30 or the like), the heat shielding portion is a part such as a first projecting portion 131b to 131d or the like arranged between the weld portion 11 and the energy storage unit 30.

Accordingly, to suppress an effect which heat exerts on a heat-susceptible object, as the heat insulating portion, the whole or a portion of the heat shielding portion such as the first projecting portion 131a to 131d is formed using a heat insulating material. That is, as the heat insulating portion, the portion of the first outer covering 100 is formed using a heat insulating material. The whole first outer covering 100 may be formed using a heat insulating material, or a portion of or the whole second outer covering 200 may be formed using a heat insulating material.

When a heat-susceptible object is a printed circuit board 42 or a relay 43 in electric equipment 40, the heat shielding portion is a cover 44 or the like which accommodates the printed circuit board 42 and the relay 43 therein. Accordingly, to suppress an effect which heat exerts on a heat-susceptible object, as the heat insulating portion, the whole or a portion of the cover 44 forming the heat shielding portion is formed using a heat insulating material. That is, the heat insulating portion may be the cover which covers the heat-susceptible object.

In this manner, in this modification, the heat shielding portion has the heat insulating portion formed using a heat insulating material. The heat insulating portion may be formed using a heat insulating material or may be formed by covering the heat shielding portion by a material having insulating property such as laminating a heat insulating tape on the heat shielding portion. As one example of the heat insulating material for forming the heat insulating portion, a dammar material formed by stacking mica flakes and bonding the mica flakes to each other can be named.

As described above, the energy storage apparatus of this modification can acquire advantageous effects substantially equal to the advantageous effects of the above-mentioned embodiment. Particularly, the heat shielding portion has the heat insulating portion formed using a heat insulating material and hence, the transfer of heat generated by thermal welding to a heat-susceptible object can be further suppressed by the heat insulating portion whereby it is possible to reduce an effect which heat exerts on a heat-susceptible object.

When the cover which covers the heat-susceptible object is formed using a heat insulating material, the transfer of heat generated by thermal welding to the heat-susceptible object can be further suppressed by the cover and hence, it is possible to reduce an effect which heat exerts on a heat-susceptible object.

By forming a portion or the whole of the first outer covering 100 or the second outer covering 200 using a heat insulating material, the inside and the outside of the first outer covering 100 or the second outer covering 200 can be thermally insulated from each other.

Although the energy storage apparatuses according to the embodiment and the modifications of the present invention have been described heretofore, the present invention is not limited to the above-mentioned embodiment and the modifications. That is, it should be construed that the embodiment and the modifications disclosed in this specification are only for an exemplifying purpose in all aspects, and the present invention is not limited by the embodiment and the modifications. The scope of the present invention is not defined by the above-mentioned description but is defined by claims, and it is intended that the present invention includes all changes made within the meaning and the scope of the invention called for in claims.

For example, in the above-mentioned embodiment and the modifications of the embodiment, the electric equipment 40 or the energy storage unit 30 is arranged as a heat-susceptible object. However, as a heat-susceptible object, other electric equipment or a container formed using a material having a melting point (or a glass transition temperature) lower than a predetermined temperature may be arranged at a position where the electric equipment 40 or the energy storage unit 30 is arranged.

In the above-mentioned embodiment and the modifications of the embodiment, the first projecting portion 131 has a larger height than the second projecting portion 132. However, the second projecting portion 132 may have a larger height than the first projecting portion 131.

In the above-mentioned embodiment and the modifications of the embodiment, the heat shielding portion is arranged away from a heat-susceptible object. However, the heat shielding portion may be partially brought into contact with a heat-susceptible object. As in the case of the modification 4, when the heat shielding portion has the heat insulating portion, even the configuration is adopted where the heat insulating portion is brought into contact with the heat-susceptible object, it is possible to reduce an effect which heat exerts on a heat-susceptible object.

In the above-mentioned embodiment and the modifications of the embodiment, a heat-susceptible object is arranged so as to face the weld portion in an opposed manner. However, a heat-susceptible object is not limited to be arranged so as to face the weld portion in an opposed manner. It is sufficient that a heat-susceptible object is arranged close to the weld portion (in the vicinity of the weld portion). For example, assume the case where the energy storage devices 310 shown in FIG. 11 are arranged in the X axis direction or in the Y axis direction so that the lid portions of the energy storage devices 310 which form heat-susceptible objects face the minus side in the Z axis direction. In this case, the lid portions do not face the weld portion, but are arranged close to the weld portion.

In the above-mentioned embodiment and the modifications of the embodiment, the energy storage device 310 is a battery which includes the metal-made container 311. However, the energy storage device 310 may be a laminate-type battery which includes a laminated container formed using a laminate film. In this case, the laminate-type battery is weak to heat. Accordingly, assuming that the laminate-type battery which forms the energy storage device 310 is a heat-susceptible object, it is possible to reduce an effect which heat generated by thermal welding exerts on the laminate-type battery by arranging a heat shielding portion between the laminate-type battery and a weld portion 11.

In the above-mentioned embodiment and the modifications of the embodiment, the weld portion is the joint portion formed by joining the first outer covering 100 and the second outer covering 200 to each other by thermal welding. However, a method of joining the first outer covering 100 and the second outer covering 200 is not limited to thermal welding, and the first outer covering 100 and the second outer covering 200 may be joined to each other by welding such as ultrasonic welding. That is, the weld portion may be a joint portion formed by joining the first outer covering 100 and the second outer covering 200 to each other by welding such as ultrasonic welding. Also in this case, when heat is generated at the weld portion, it is possible to reduce an effect which heat generated by welding exerts on the heat-susceptible object by the heat shielding portion arranged between the weld portion and a heat-susceptible object.

Further, the configurations which are made by arbitrarily combining the respective elements which the above-mentioned embodiment and the modifications of the embodiment include also fall within the scope of the present invention. For example, as described above, the configuration where the modification 3 is applied to the modification 1 or 2, or the configuration where the modification 4 is applied to the modifications 1 to 3 also fall within the scope of the present invention.

The present invention is applicable to an energy storage apparatus or the like where one or more energy storage devices are accommodated in an outer covering.

What is claimed is:

1. An energy storage apparatus, comprising:
 one or more energy storage devices;
 a first outer covering and a second outer covering arranged outside said one or more energy storage devices;
 a weld portion which comprises a joint portion disposed between the first outer covering and the second outer covering formed by joining the first outer covering and the second outer covering to each other by welding;
 a heat-susceptible object;
 a heat shielding portion arranged between the weld portion and the heat-susceptible object, wherein the heat-susceptible object includes a printed circuit board; and
 a projecting portion formed on:
  the first outer covering, the projecting portion protruding outward from an outer surface of the first outer covering in a stacking direction, of the heat shielding portion, the weld portion, and the projecting portion arranged along a side of the first outer covering; or
  the second outer covering, the projecting portion protruding outward from an outer surface of the second outer covering further than the first outer covering,
 wherein the projecting portion is arranged so as to sandwich the weld portion between the heat shielding portion and the projecting portion.

2. The energy storage apparatus according to claim 1, wherein the first outer covering includes another projecting portion which projects toward the second outer covering as the heat shielding portion.

3. The energy storage apparatus according to claim 2, wherein the projecting portion is formed on the first outer covering, and
 wherein said another projecting portion has a larger height than the projecting portion.

4. The energy storage apparatus according to claim 1, wherein the heat shielding portion is arranged away from the heat-susceptible object.

5. The energy storage apparatus according to claim 1, wherein the heat shielding portion includes a heat insulating portion including a heat insulating material.

6. The energy storage apparatus according to claim 1, wherein the printed circuit board is electrically connected to said one or more energy storage devices.

7. The energy storage apparatus according to claim 6, wherein the printed circuit board is arranged between said one or more energy storage devices and the weld portion at a position closer to the weld portion than said one or more energy storage devices.

8. The energy storage apparatus according to claim 1, wherein the heat-susceptible object includes a non-aqueous electrolytic secondary battery which comprises said one or more energy storage devices.

9. The energy storage apparatus according to claim 1, wherein the beat-susceptible object includes said one or more energy storage devices having a lid portion arranged close to the weld portion.

10. The energy storage apparatus according to claim 1, wherein the heat-susceptible object includes a resin-made frame body.

11. A method of manufacturing the energy storage apparatus according to claim 1, the method comprising:
heating the joint portion between the first outer covering and the second outer covering, the joint portion being arranged so as to sandwich the heat shielding portion between the joint portion and the heat-susceptible object; and
forming the weld portion by joining, by welding, the first outer covering and the second outer covering at the joint portion.

12. An energy storage apparatus, comprising:
one or more energy storage devices;
a first outer covering and a second outer covering arranged outside said one or more energy storage devices;
a weld portion which comprises a joint portion disposed between the first outer covering and the second outer covering formed by joining the first outer covering and the second outer covering to each other by welding;
a heat-susceptible object;
a heat shielding portion arranged between the weld portion and the heat-susceptible object;
a first projecting portion formed on the first outer covering and projecting toward the second outer covering as the heat shielding portion; and
a second projecting portion formed on the first outer covering or the second outer covering, the second projecting portion protruding outward from an outer surface of the first outer covering or from an outer surface of the second outer covering further than the first outer covering, such that the second projecting portion is arranged so as to sandwich the weld portion between the first projecting portion and the second projecting portion.

13. The energy storage apparatus according to claim 12, wherein the first outer covering is configured such that, with the weld portion interposed between the first projecting portion and the second projecting portion, the first projecting portion is disposed inside the weld portion and the second projecting portion is disposed outside the weld portion, and the first projecting portion has a higher height than the second projecting portion.

14. The energy storage apparatus according to claim 12, wherein the first projecting portion protrudes from the first outer covering in a direction orthogonal to a direction that the second projecting portion protrudes from the outer surface of the first outer covering or the outer surface of the second outer covering.

15. The energy storage apparatus according to claim 12, wherein the second projecting portion protrudes from the outer surface of the first outer covering in a direction orthogonal to a direction that the first projecting portion protrudes from the first outer covering.

16. The energy storage apparatus according to claim 12, wherein the second projecting portion protrudes from the outer surface of the second outer covering in a direction orthogonal to a direction that the first projecting portion protrudes from the first outer covering.

17. The energy storage apparatus according to claim 12, wherein the first projecting portion protrudes from the first outer covering in a direction perpendicular to a direction that the second projecting portion protrudes outward from the outer surface of the first outer covering or from the outer surface of the second outer covering.

* * * * *